United States Patent
Jha et al.

(10) Patent No.: US 11,797,501 B2
(45) Date of Patent: Oct. 24, 2023

(54) METHODS AND SYSTEMS FOR AGGREGATING AND QUERYING LOG MESSAGES

(71) Applicant: VMWARE, INC., Palo Alto, CA (US)

(72) Inventors: Chandrashekhar Jha, Bangalore (IN); Navya Sree Tirunagari, Bangalore (IN); Yash Bhatnagar, Bangalore (IN); Ritesh Jha, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 71 days.

(21) Appl. No.: 17/174,378

(22) Filed: Feb. 12, 2021

(65) Prior Publication Data

US 2022/0197879 A1   Jun. 23, 2022

(30) Foreign Application Priority Data

Dec. 21, 2020   (IN) .............................. 202041055577

(51) Int. Cl.
| | |
|---|---|
| *G06F 16/21* | (2019.01) |
| *G06F 16/23* | (2019.01) |
| *G06F 16/242* | (2019.01) |
| *G06F 16/25* | (2019.01) |
| *G06F 11/34* | (2006.01) |
| *G06F 11/07* | (2006.01) |
| *G06F 16/2458* | (2019.01) |

(52) U.S. Cl.
CPC .......... *G06F 16/217* (2019.01); *G06F 11/079* (2013.01); *G06F 11/3419* (2013.01); *G06F 16/2358* (2019.01); *G06F 16/244* (2019.01); *G06F 16/2477* (2019.01); *G06F 16/256* (2019.01)

(58) Field of Classification Search
CPC .. G06F 16/217; G06F 16/2477; G06F 16/256; G06F 16/244; G06F 16/2358
See application file for complete search history.

(56) References Cited

U.S. PATENT DOCUMENTS

| | | | |
|---|---|---|---|
| 7,194,451 B2 * | 3/2007 | Chaudhuri | .......... G06F 16/2358 707/718 |
| 10,338,977 B2 * | 7/2019 | Yoon | ..................... G06F 16/338 |

(Continued)

FOREIGN PATENT DOCUMENTS

| | | | |
|---|---|---|---|
| WO | WO2013/002811 A1 | * | 1/2013 |
| WO | WO2013002811 | * | 12/2013 |

*Primary Examiner* — Daniel A Kuddus

(57) ABSTRACT

Methods and systems described herein are directed to aggregating and querying log messages. Methods and systems determine event types of log message generated by event sources of the distributed computing system. The event types are aggregated into aggregated records for a shortest time unit and event types are aggregated into aggregated records for longer time units based on the aggregated records associated with the shortest time unit. In response to a query regarding occurrences of an event type in a query time interval, the query time interval is split into subintervals with time lengths that range from the shortest time unit to a longest time unit that lie within the query time interval. The method determines a total event count of occurrences of the event type in the query time interval based on the aggregated records with time stamps in the subintervals. The event count in the query time interval may be used to detect abnormal behavior of the event sources.

18 Claims, 33 Drawing Sheets

(56) References Cited

U.S. PATENT DOCUMENTS

| | | | | |
|---|---|---|---|---|
| 10,353,756 B2* | 7/2019 | Yoon | .................. | G06F 17/40 |
| 10,489,229 B2* | 11/2019 | Mustafi | ................ | G06F 11/076 |
| 10,908,977 B1* | 2/2021 | Ferstay | ............... | G06F 11/3476 |
| 10,990,607 B1* | 4/2021 | Altman | ............. | G06F 16/24556 |
| 11,055,405 B1* | 7/2021 | Jin | ....................... | G06F 16/245 |
| 2005/0192921 A1* | 9/2005 | Chaudhuri | .......... | G06F 16/2358 |
| 2014/0122461 A1* | 5/2014 | Singla | ................... | G06F 21/577 |
| | | | | 707/722 |
| 2016/0140238 A1* | 5/2016 | Swan | ................. | G06F 16/2322 |
| | | | | 707/746 |
| 2017/0249200 A1* | 8/2017 | Mustafi | .............. | G06F 11/0709 |
| 2018/0173739 A1* | 6/2018 | Baum | .............. | G06F 16/24575 |
| 2019/0165990 A1* | 5/2019 | Bishnoi | .............. | H04L 41/0622 |
| 2020/0334254 A1* | 10/2020 | Arye | .................. | G06F 16/2393 |

\* cited by examiner log.write([[$Time_date] [Thread-$X/$IP/INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [$Time_date] Repair session $RS for range $range finished)

304 — $Time_date
306 — Thread-$X
308 — $IP
310 — INFO
312 — Repair session $RS for range
314 — 302

FIG. 3

[2019-03-10 23:43:36.859+0000] [Thread-1822496/127.0.0.1 INFO] [com.vmware.loginsight.commons.executor.ProcessExecutor] [ [[/usr/lib/loginsight/application/lib/apache-cassandra-2.0.10/bin/nodetool, -h, montools-prod-loginsight.vmware.com, repair]] [2015-03-10 23:43:36,716] Repair session 51312720-c77e-11e4-ad72-4769d614a3f2 for range (-6899937477723537626, -6896547230076663429) finished]

2019-12-02T10:44:24.095Z li-qe-esx5.vmware.com Rhttpproxy:
[28959B90 verbose 'Proxy Req 46691'] Connected to localhost:8307
506

2019-12-02T10:44:24.094Z li-qe-esx5.vmware.com Rhttpproxy:
[FFFC2B90 verbose 'Proxy Req 46691'] new proxy client TCP (local-
127.0.0.1:80, peer=127.0.0.1:50155)

2019-12-02T10:44:24.093Z li-qe-esx5.vmware.com Rhttpproxy: [2889B90
verbose 'Proxy Req 46685'] The client closed the stream, not
unexpectedly.

Dec  2 18:48:29 strata-vc 2019-12-02T18:48:30.273Z [7FA39448B700
info 'commonvpxLro' opID=1947d6f9] [VpxLRO] - FINISH task-
internal-2163522 -- -- vim.SessionManager.logout -

2019-12-02T18:48:51.396Z strata-esx1.eng.vmware.com Vpxa: [65B5AB90
verbose 'VpxaHalCnxHostagent' opID=WFU-ed393333]
[WaitForUpdatesDone] Completed callback 2019-12-02T18:48:51.395Z strata-esx1.eng.vmware.com Vpxa:[65B5AB90
verbose 'VpxaHalCnxHostagent' opID=WFU-ed393333]
[WaitForUpdatesDone] Starting next WaitForUpdates() call to hostd 2019-12-02T18:48:51.395Z strata-esx1.eng.vmware.com Vpxa: [65B5AB90
verbose 'vpxavpxaInvtVm' opID=WFU-ed393333]
[VpxaInvtVmChangeListener] Guest DiskInfo Changed 2019-12-02T18:48:51.395Z strata-esx1.eng.vmware.com Vpxa: [65B5AB90
verbose 'vpxavpxaInvtVm' opID=WFU-ed393333]
[VpxaInvtVmChangeListener] Guest DiskInfo Changed

| Field Name | Field Description |
|---|---|
| id | System generated unique ID for the record |
| timestamp | Time (e.g., start time of the time unit) |
| event_type | Event type ID |
| event_count | A count of log messages for the event type in the specified time unit |
| sample_text | Sample text for the log message |
| time_unit | Duration for which the event count is determined. Duration can be in seconds, minutes, hours, days, weeks, months etc. |

FIG. 8B

METHODS AND SYSTEMS FOR AGGREGATING AND QUERYING LOG MESSAGES

RELATED APPLICATIONS

Benefit is claimed under 35 U.S.C. 119(a)-(d) to Foreign Application Serial No. 202041055577 filed in India entitled "METHODS AND SYSTEMS FOR AGGREGATING AND QUERYING LOG MESSAGES", on Dec. 21, 2020, by VMware, Inc., which is herein incorporated in its entirety by reference for all purposes.

TECHNICAL FIELD

This disclosure is directed to aggregating and querying of log messages.

BACKGROUND

Data centers execute thousands of applications that enable businesses, governments, and other organizations to offer services over the Internet. These organizations cannot afford problems that result in downtime or slow performance of their applications. Performance issues can frustrate users, damage a brand name, result in lost revenue, and deny people access to vital services. Various management tools have been developed to collect performance information about applications, services, and hardware that aid system administrators and application owners with detection of problems. A typical log management tool, for example, records log messages generated by various operating systems and applications executing in a data center. Each log message is an unstructured or semi-structured time-stamped message that records information about the state of an operating system, state of an application, state of a service, or state of computer hardware at a point in time. Most log messages record benign events, such as input/output operations, client requests, logins, logouts, and statistical information about the execution of applications, operating systems, computer systems, and other devices of a data center. For example, a web server executing on a computer system generates a stream of log messages, each of which describes a date and time of a client request, web address requested by the client, and IP address of the client. Other log messages record diagnostic information, such as alarms, warnings, errors, or emergencies. System administrators and application owners use depend on log messages to perform root cause analysis ("RCA") of problems, perform troubleshooting, and monitor execution of applications, operating systems, computer systems, and other devices of a data center.

With the increasing number of organizations offering services over the Internet, the volumes of log messages and rates at which log messages are generated is increasing. For example, an application executing in a data center may generate millions of log messages per minute with only a fraction that may be used to determine a root cause of a problem. Log management tools ingest large bundles of log messages and aid system administrators and application owners in aggregating and classifying log messages. However, because log management tools now have to process tera bytes of log messages per day and with the continued increase in scale and complexity of distributed computing systems, it is becoming increasingly more challenging for these tools to keep up with the increasing volumes of log messages, resulting in delays in performing log classification, determination of field inferences, finding event trends, and performing RCA, which delays troubleshooting and execution of remedial measures to correct problems and prolongs interruptions in services and increases costs for application owners. System administrators and application owners seek log management tools that decrease the time to log aggregation and classification so that system administrators and application owners have time to troubleshoot performance problems and timely execute remedial measures.

SUMMARY

Methods and systems described herein are directed to aggregating and querying log messages. In one aspect, the method is executed in using processors of a computer system to determine event types of log message generated by event sources of a distributed computing system. The method aggregates the event types into aggregated records for a shortest time unit and aggregates the event types into aggregated records for longer time units based on the aggregated records associated with the shortest time unit. In response to receiving a query regarding occurrences of an event type in a query time interval, the query time interval splits the query time interval into subintervals with time lengths that range from the shortest time unit to a longest time unit that lie within the query time interval. The method determines a total event count of occurrences of the event type in the query time interval based on the aggregated records with time stamps in the subintervals. The event count in the query time interval may be used to detect abnormal behavior of the even sources.

DESCRIPTION OF THE DRAWINGS

FIG. 3 shows an example of a log write instruction.

FIG. 4 shows an example of a log message generated by the log write instruction in FIG. 3.

FIG. 5 shows a small, eight-entry portion of a log file.

FIG. 8B shows an example representation of an aggregated record stored in an aggregated records database of a data storage devices.

DETAILED DESCRIPTION

This disclosure is directed to methods and systems for aggregating and querying log messages. Log messages and log files are described below in a first subsection. An example of a log management server executed in a distributed computing system is described below in a second subsection. Performance of current log management tools are described in a second subsection. Methods and systems for log message aggregation are described in third subsection.

Log Messages and Log Files

Figure 1:
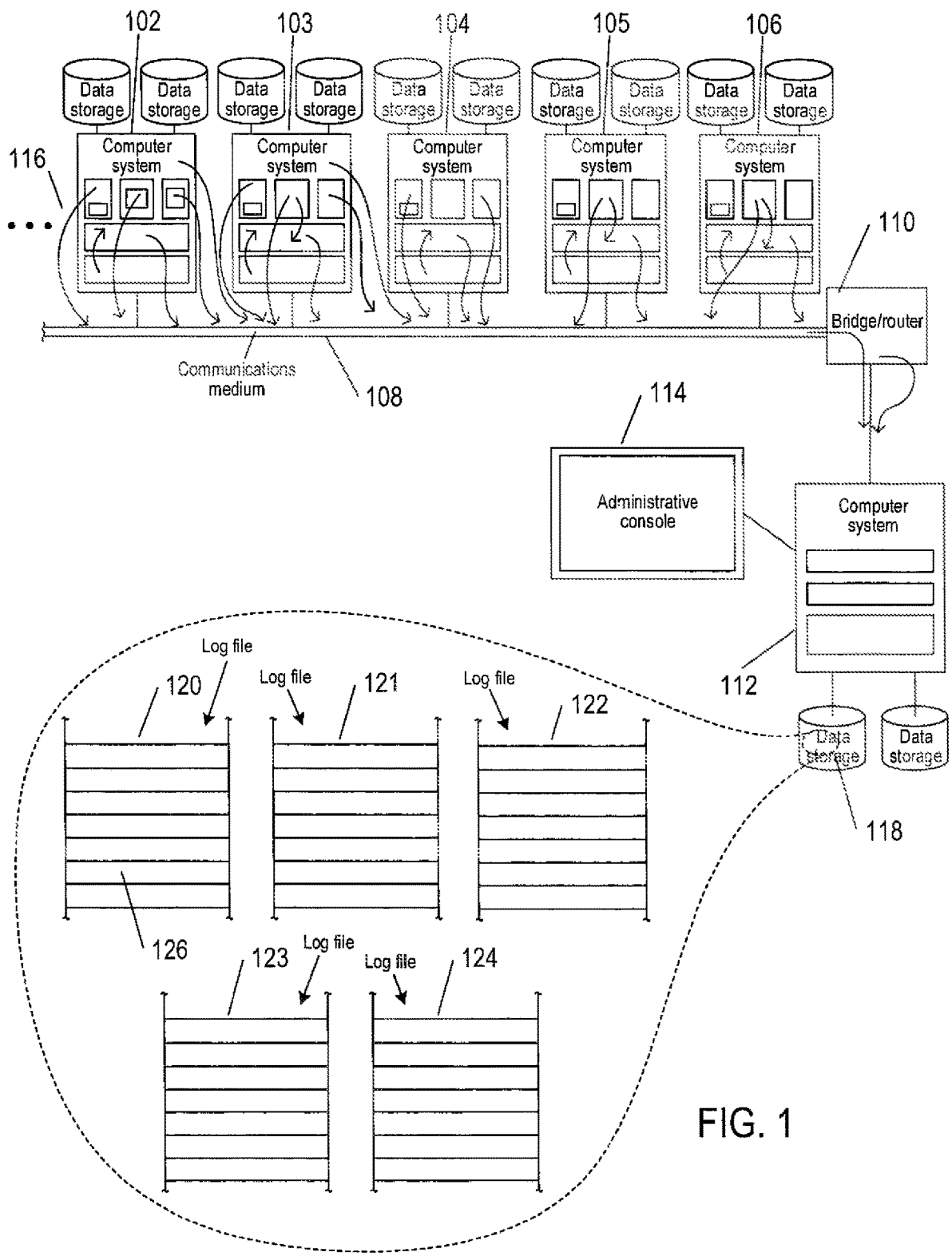
FIG. 1 shows an example of logging log messages in log files.

FIG. 1 shows an example of logging log messages in log files. In FIG. 1, computer systems 102-106 within a distributed computing system, such as data center, are linked together by an electronic communications medium 108 and additionally linked through a communications bridge/router 110 to an administration computer system 112 that includes an administrative console 114 and executes a log management server described below. Each of the computer systems 102-106 may run a log monitoring agent that forwards log messages to the log management server executing on the administration computer system 112. As indicated by curved arrows, such as curved arrow 116, multiple components within each of the discrete computer systems 102-106 as well as the communications bridge/router 110 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 102-106, the bridge/router 110 and any other components of a data center. Log messages may be received by log monitoring agents at various hierarchical levels within a discrete computer system and then forwarded to the log management server executing in the administration computer system 112. The log management server records the log messages in a data-storage device or appliance 118 as log files 120-124. Rectangles, such as rectangle 126, represent individual log messages. For example, log file 120 may contain a list of log messages generated within the computer system 102. Each log monitoring agent has a configuration that includes a log path and a log parser. The log path specifies a unique file system path in terms of a directory tree hierarchy that identifies the storage location of a log file on the administration computer system 112 or the data-storage device 118. The log monitoring agent receives specific file and event channel log paths to monitor log files and the log parser includes log parsing rules to extract and format lines of the log message into log message fields described below. Each log monitoring agent sends a constructed structured log message to the log management server. The administration computer system 112 and computer systems 102-106 may function without log monitoring agents and a log management server, but with less precision and certainty.

Figure 2:
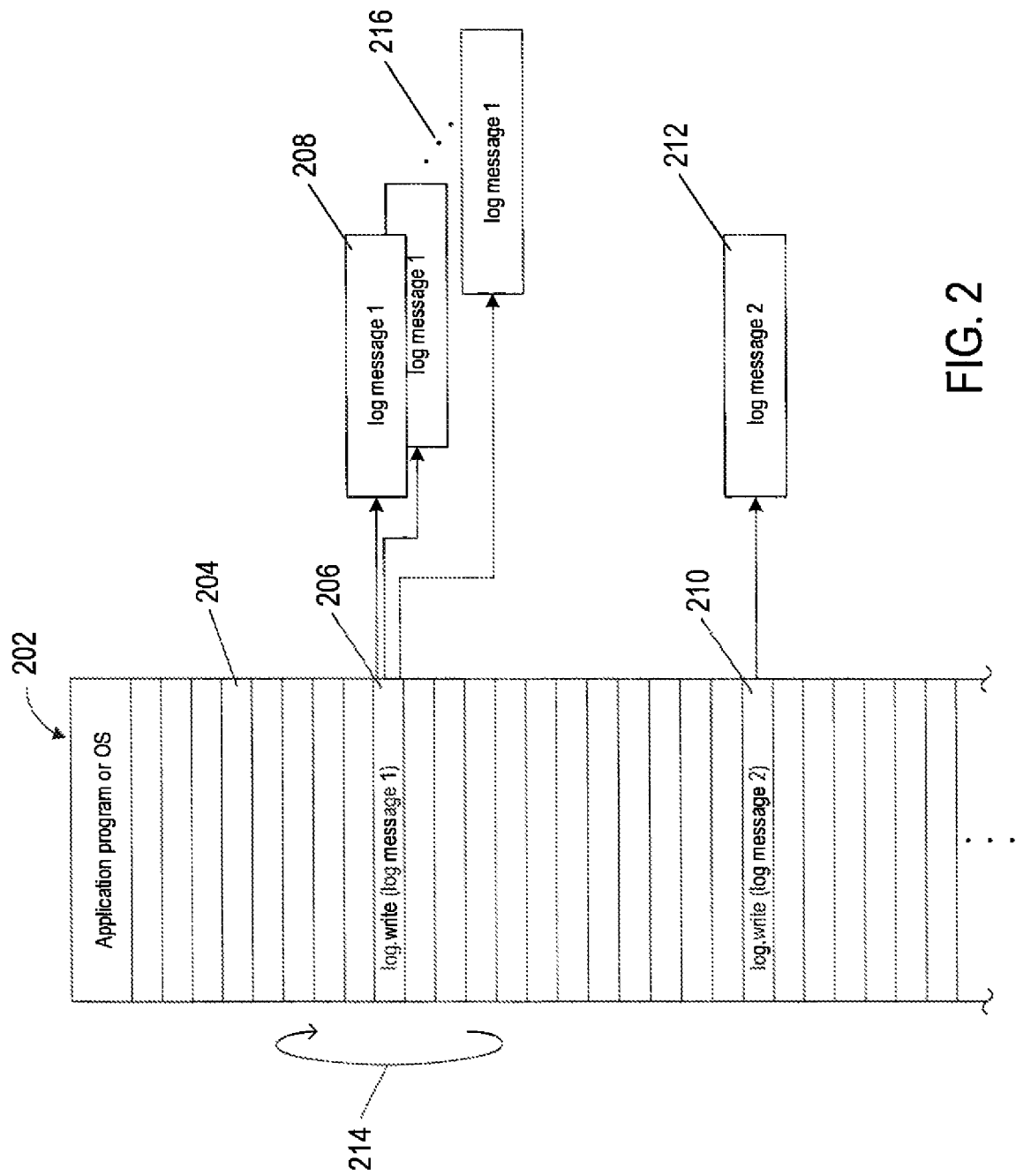
FIG. 2 shows an example source code of an event source.

FIG. 2 shows an example source code 202 of an event source, such as an application, an operating system, a VM, a guest operating system, or any other computer program or machine code that generates log messages. The source code 202 is just one example of an event source that generates log messages. Rectangles, such as rectangle 204, represent a definition, a comment, a statement, or a computer instruction that expresses some action to be executed by a computer. The source code 202 includes log write instructions that generate log messages when certain events predetermined by a developer occur during execution of the source code 202. For example, source code 202 includes an example log write instruction 206 that when executed generates a "log message 1" represented by rectangle 208, and a second example log write instruction 210 that when executed generates "log message 2" represented by rectangle 212. In the example of FIG. 2, the log write instruction 208 is embedded within a set of computer instructions that are repeatedly executed in a loop 214. As shown in FIG. 2, the same log message 1 is repeatedly generated 216. The same type of log write instructions may also be located in different places throughout the source code, which in turns creates repeats of essentially the same type of log message in the log file.

In FIG. 2, the notation "log.write( )" is a general representation of a log write instruction. In practice, the form of the log write instruction varies for different programming languages. In general, the log write instructions are determined by the developer and are unstructured, or semi-structured, and in many cases are relatively cryptic. For example, log write instructions may include instructions for time stamping the log message and contain a message comprising natural-language words and/or phrases as well as various types of text strings that represent file names, path names, and perhaps various alphanumeric parameters that may identify objects, such as VMs, containers, or virtual network interfaces. In practice, a log write instruction may also include the name of the source of the log message (e.g., name of the application program, operating system and version, server computer, and network device) and may include the name of the log file to which the log message is recorded. Log write instructions may be written in a source code by the developer of an application program or operating system in order to record the state of the application program or operating system at point in time and to record events that occur while an operating system or application program is executing. For example, a developer may include log write instructions that record informative events including, but are not limited to, identifying startups, shutdowns, I/O operations of applications or devices; errors identifying runtime deviations from normal behavior or unexpected conditions of applications or non-responsive devices; fatal events identifying severe conditions that cause premature termination; and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 3 shows an example of a log write instruction 302. The log write instruction 302 includes arguments identified with "$" that are filled at the time the log message is created. For example, the log write instruction 302 includes a time-stamp argument 304, a thread number argument 306, and an internet protocol ("IP") address argument 308. The example log write instruction 302 also includes text strings and natural-language words and phrases that identify the level of importance of the log message 310 and type of event that triggered the log write instruction, such as "Repair session" argument 312. The text strings between brackets "[ ]" represent file-system paths, such as path 314. When the log write instruction 302 is executed by a log management agent, parameters are assigned to the arguments and the text strings and natural-language words and phrases are stored as a log message of a log file.

FIG. 4 shows an example of a log message 402 generated by the log write instruction 302. The arguments of the log write instruction 302 may be assigned numerical parameters that are recorded in the log message 402 at the time the log message is executed by the log management agent. For example, the time stamp 304, thread 306, and IP address 308 arguments of the log write instruction 302 are assigned corresponding numerical parameters 404, 406, and 408 in the log message 402. Alphanumeric expression 410 is assigned to a repair session argument 312. The time stamp 404 represents the date and time the log message 402 is generated. The text strings and natural-language words and phrases of the log write instruction 302 also appear unchanged in the log message 402 and may be used to identify the type of event (e.g., informative, warning, error, or fatal) that occurred during execution of the event source.

As log messages are received from various event sources, the log messages are stored in corresponding log files in the order in which the log messages are received. FIG. 5 shows a small, eight-entry portion of a log file 502. In FIG. 5, each rectangular cell, such as rectangular cell 504, of the log file 502 represents a single stored log message. For example, log message 504 includes a short natural-language phrase 506, date 508 and time 510 numerical parameters, and an alphanumeric parameter 512 that identifies a particular host computer.

Log Management Server

In large distributed computing systems, such as a data center, terabytes of log messages may be generated each day. The log messages may be sent to a log management server that records the log messages in log files that are in turn stored in data-storage appliances.

Figure 6A:
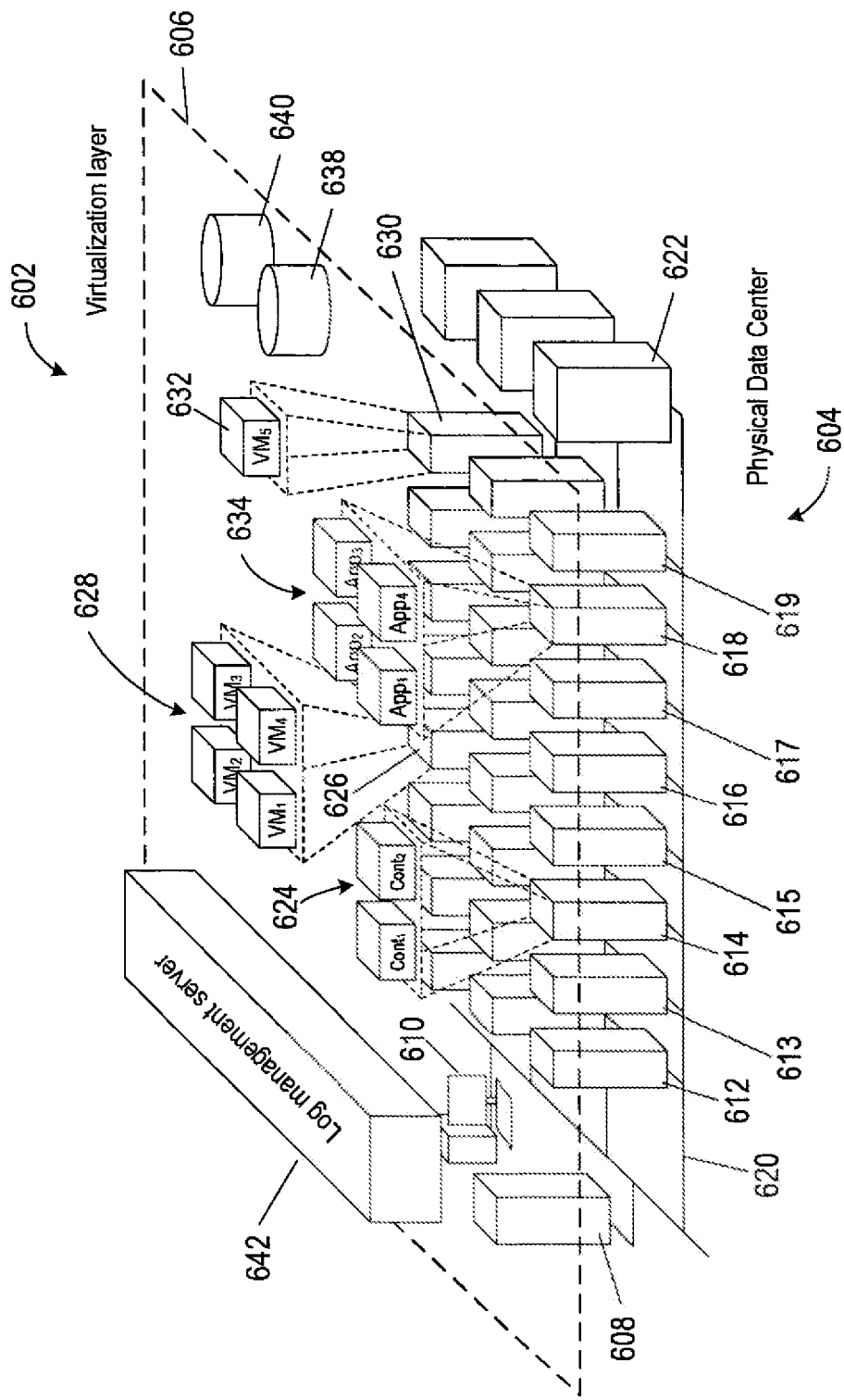
FIGS. 6A-6C show an example of the log management server receiving log messages from event sources.

FIG. 6A shows an example of a virtualization layer 602 located above a physical data center 604. For the sake of illustration, the virtualization layer 602 is separated from the physical data center 604 by a virtual-interface plane 606. The physical data center 604 is an example of a distributed computing system. The physical data center 604 comprises physical objects, including an administration computer system 608, any of various computers, such as PC 610, on which a virtual data center ("VDC") management interface may be displayed to system administrators and other users, server computers, such as server computers 612-619, data-storage devices, and network devices. The server computers may be networked together to form networks within the data center 604. The example physical data center 604 includes three networks that each directly interconnects a bank of eight server computers and a mass-storage array. For example, network 620 interconnects server computers 612-619 and a mass-storage array 622. Different physical data centers may include many different types of computers, networks, data-storage systems and devices connected according to many different types of connection topologies. The virtualization layer 602 includes virtual objects, such as VMs, applications, and containers, hosted by the server computers in the physical data center 604. The virtualization layer 602 may also include a virtual network (not illustrated) of virtual switches, routers, load balancers, and network interface cards formed from the physical switches, routers, and network interface cards of the physical data center 604. Certain server computers host VMs and containers as described above. For example, server computer 614 hosts two containers 624, server computer 626 hosts four VMs 628, and server computer 630 hosts a VM 632. Other server computers may host applications as described above with reference to FIG. 4. For example, server computer 618 hosts four applications 634. The virtual-interface plane 606 abstracts the resources of the physical data center 604 to one or more VDCs comprising the virtual objects and one or more virtual data stores, such as virtual data stores 638 and 640. For example, one VDC may comprise VMs 628 and virtual data store 638. Automated methods and systems described herein may be executed by a log management server 642 implemented in one or more VMs on the administration computer system 608. The log management server 642 receives log messages generated by event sources and records the log messages in log files as described below.

Figure 6B:
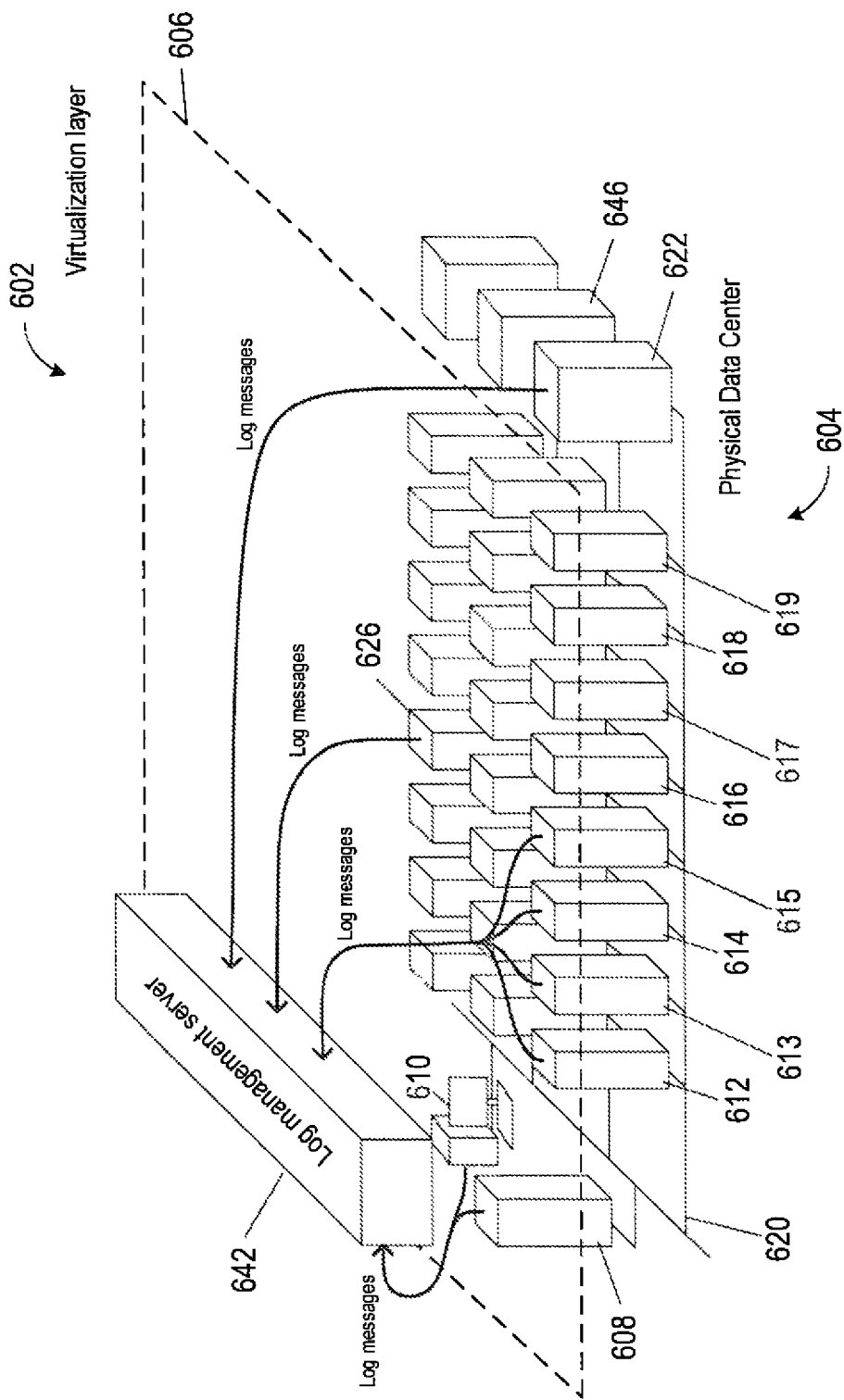
Figure 6C:
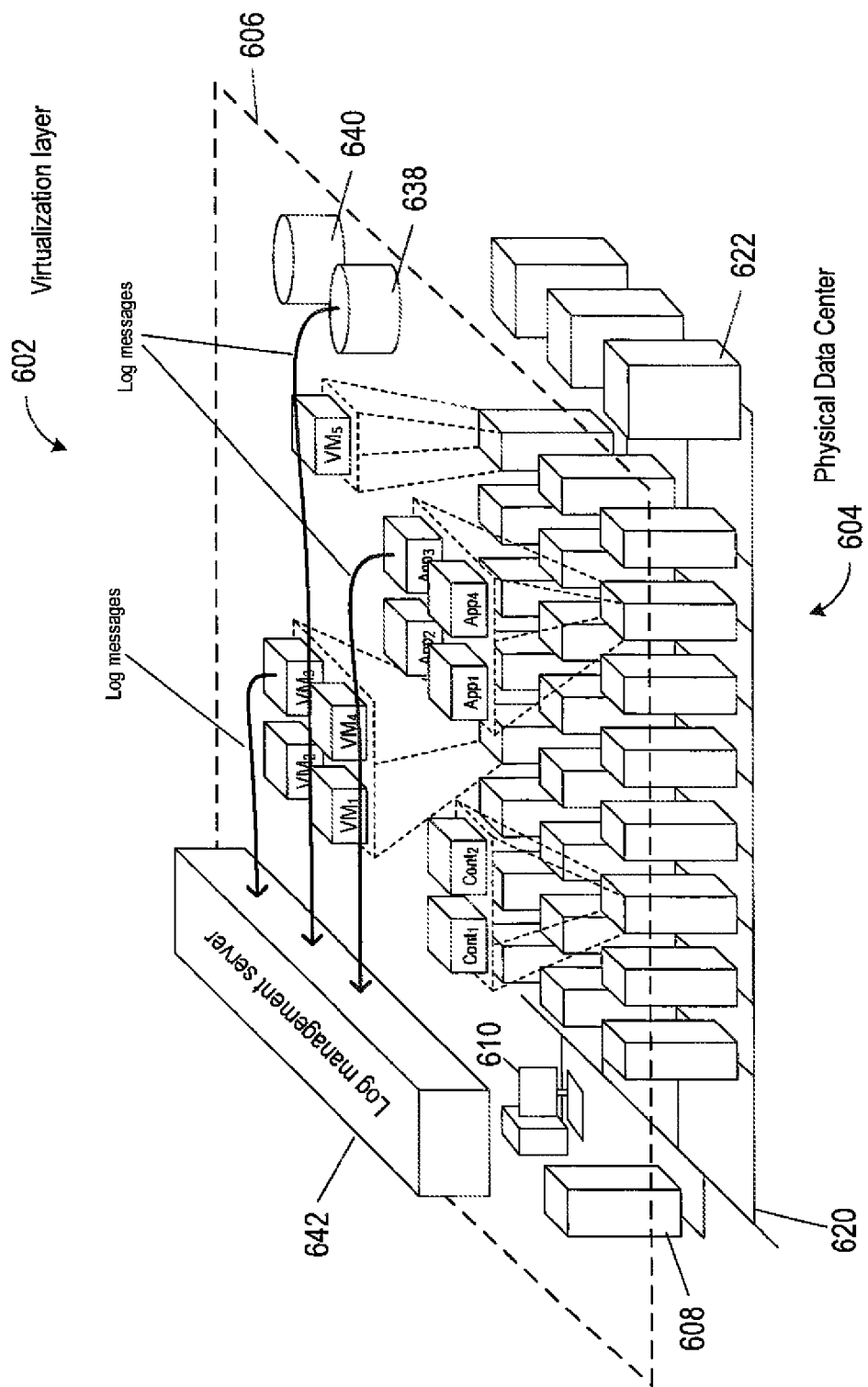

FIGS. 6B-6C show the example log management server 642 receiving log messages from event sources. Directional arrows represent log messages sent to the log management server 642. In FIG. 6B, operating systems and applications running on PC 610, server computers 608 and 644, network devices, and mass-storage array 646 send log messages to the log management server 642. Operating systems and applications running on clusters of server computers may also send log messages to the log management server 642. For example, a cluster of server computers 612-615 sends log messages to the log management server 642. In FIG. 6C, guest operating systems, VMs, containers, applications, agents, and virtual storage may independently send log messages to the log management server 642.

Performance of Current Log Management Tools

Figure 7:
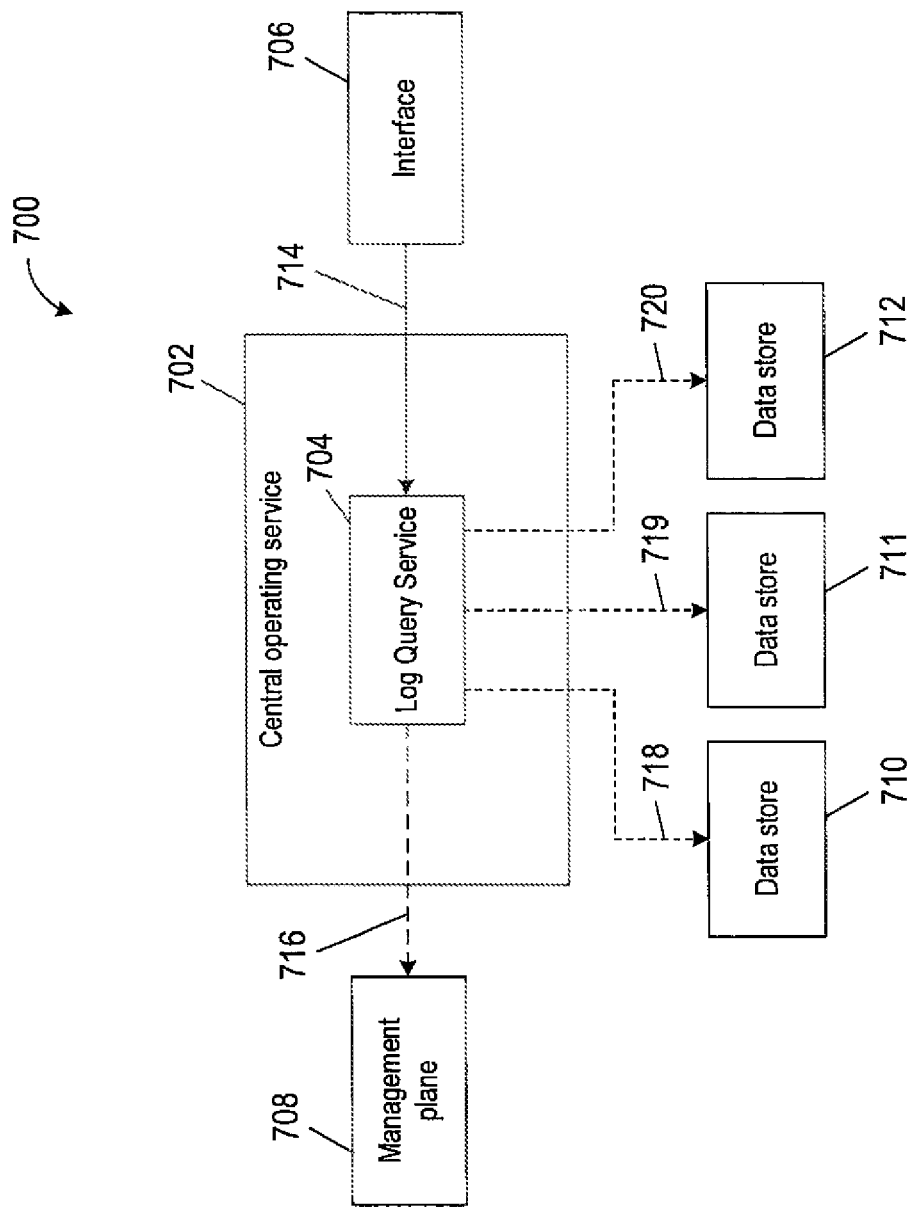
FIG. 7 shows an architecture of a typical log management tool that ingest large volumes of log messages and is used to query the log messages of different event types.

FIG. 7 shows an architecture of a typical log management 700 tool that ingest large volumes of log messages and is used to query the log messages of different event types. The log management tool 700 includes a central operating service 702, which in turn executes a log query service 704 that processes queries received from an interface 706. A typical query is a request for a number of log messages of a particular event type generated within a time interval called a "query time interval." The interface 706 may be, for example, a graphical user interface, LINT UI ("VMware® Log Intelligence user interface"), or a client application programming interface ("API"). The log management tool 700 includes a management plane 708 and, in this example, three databases 710-712. Each database includes a search engine and document database with a logic unit that stores log messages and performs log message indexing, such as Ops Data Solr cores by Apache Solr. The management plane 706 stores information that maps each data center tenant to a location where each tenant's log message data is stored in one of the databases 710-712. Directional arrow 714 represents an event type count query sent from the interface 706 to the log query service 704. Directional arrow 714 represents a request sent from the log query service 704 to the management plane 708 to get information regarding which database stores the requested event type count. Directional arrows 718-720 represent requests for event type counts sent to the databases 710-712 in response to receiving the information regarding which database(s) stores the requested event type counts.

However, the typical log management tool 700 takes a significant amount of time to generate an event type count in response to an event type count request, especially for large tenants that ingest millions of log messages per minute and as the query time interval increases. The following table provides a list of total response time for different query time intervals for VMware Cloud monitor site reliability engineer ("VMC-SRE") team implemented with the architecture shown in FIG. 7:

TABLE

| Query time interval | Total Response Time |
|---|---|
| 5 Minutes | 3 Seconds |
| 1 Hour | 20 Seconds |
| 12 Hours | 65 Seconds |
| 1 Month | 10 Minutes |

System administrators and application owners use log messages to perform root cause analysis ("RCA") of problems, perform troubleshooting, and monitor execution of applications, operating systems, computer systems, and other devices of the data center. The long response times shown in the table are unacceptable for providing real time analytical insight into event type trends, troubleshooting, and RCA. Organizations that run applications in data centers cannot afford problems that result in downtime or slow performance of their applications. Performance issues frustrate users, damage a brand name, result in lost revenue, and deny people access to vital services.

Methods and Systems for Log Message Aggregation

Figure 8A:
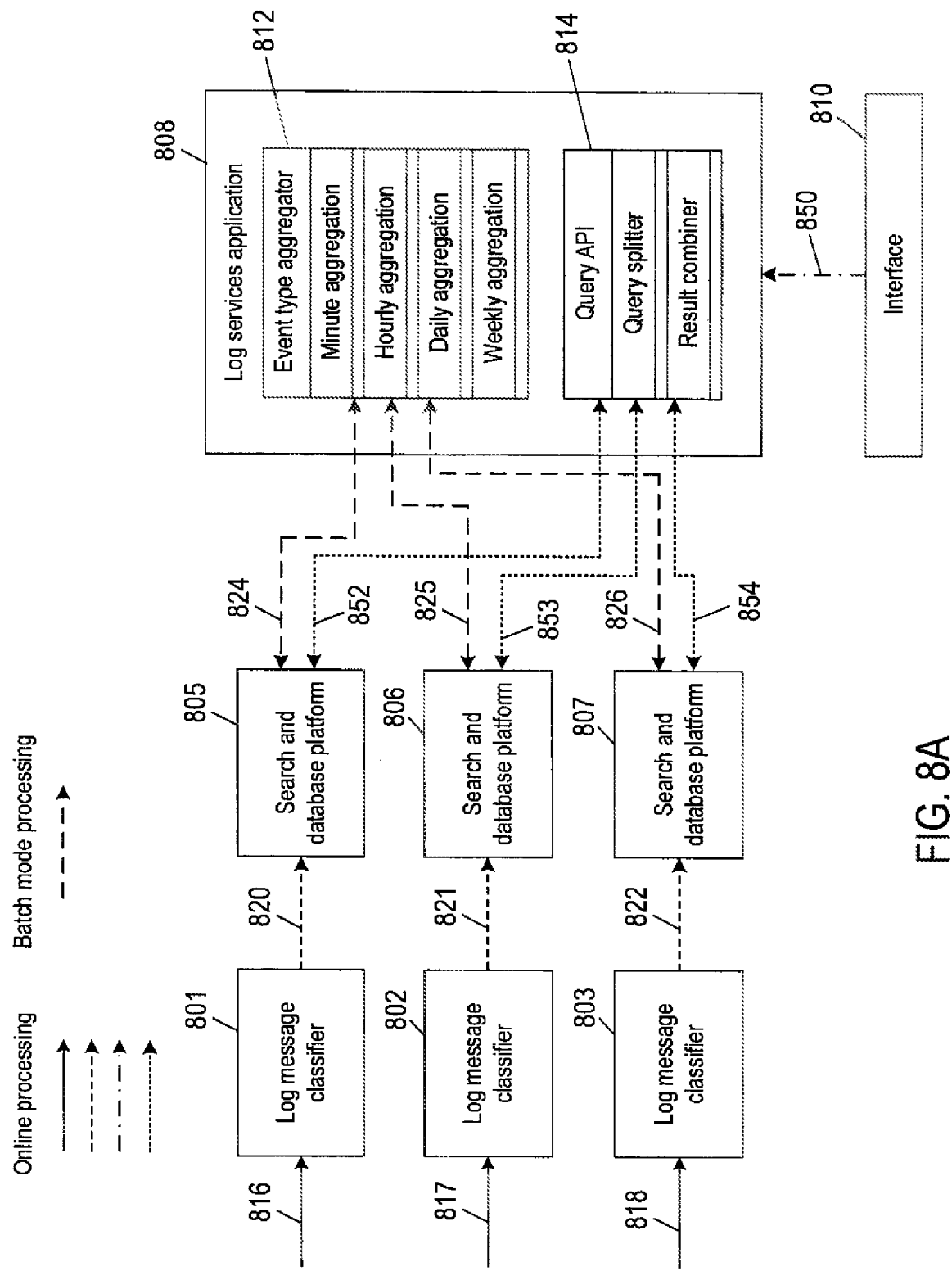
FIG. 8A shows an architecture for a log management tool that provides real-time event-type aggregation and real-time responses to event type request.

FIG. 8A shows an architecture for a log management tool 800 that provides real-time event-type aggregation and real-time responses to event type count requests. In this example, the log management tool 800 includes three log message classifiers 801-803, three search and database platforms 805-807, a log service application 808, and an interface 810. The log service application 808 includes an event-type aggregator 812 and a query API 814. Directional arrows are used to represent the flow of data between components of the log management tool 800. Solid arrows 816-818 represent sending payloads of log messages to the log message classifiers 801-803. Each log message classifier receives the same payload of log messages, classifies the log messages according to event types, and performs a first of the time levels event-type aggregation by aggregating the event types into corresponding second-level aggregated records, as described below with reference to FIGS. 9-11. Note that the word "second-level" in the term "second-level aggregated record" refers to a time unit of seconds associated with the aggregated record and is not intended to infer a rank ordering of the aggregated records. In other words, the term "second-level aggregated record" does not mean that there is a first-level aggregated record and that a second-level aggregated record is at a second level with respect to a first level. Dashed arrows 820-822 represent sending the second-level aggregated records from the log message classifiers 801-803 to corresponding search and database platforms 805-807. Each search and database platform includes an aggregated records database that stores aggregated records and has a search engine that performs index searches on the aggregated records database for aggregated records. For example, the search and database platforms 805-807 may be implemented using Ops Data Solr cores by Apache Solr. The event-type aggregator 812 aggregates batches of aggregation records stored in the search and database platforms 805-807 to obtain higher-level aggregated records that are stored in the search and database platforms 805-807. Long dashed double-headed arrows 824-826 represent the retrieval of aggregated records from the search and database platforms 805-807 and storage of the higher-level aggregated records produced by the event-type aggregator 812 in the search and database platforms 805-807.

FIG. 8B shows an example representation of an aggregated record stored in an aggregated records database of a data storage devices used by at least one of the search and database platforms 805-807. In this example, an aggregated record includes a field name column 828 that list variable names of the field information listed in column 830. An aggregated record records the variable names and the associated information. For example, an aggregated record records a system generated ID for the record, a time stamp, an event type ID associated with the event type, an event count of the number of times the event type occurs within the time unit, and sample text associated with the event type. The time unit is on the order of seconds for a second-level aggregated record, on the order of minutes for a minute-level aggregated record, on the order of hours for an hour-level aggregated record, on the order of days for a day-level aggregated record, and on the order of weeks for a week-level aggregated record. Although the following discussion describes aggregating records up to week-level aggregated records, other implementations may include aggregating records to obtain month-level aggregated records and year-level aggregated records.

Note that the terms "lower-level" and "higher-level" are relative terms that distinguish durations of the time units associated with the different kinds of aggregated records. An aggregated record with a shorter time unit than the time unit of another aggregated record is referred to as a lower-level aggregate record with respect to the other aggregated record. An aggregated record with a longer time unit than the time unit of another aggregated record is referred to as a higher-level aggregate record with respect to the other aggregated record. The lowest-level aggregated records are the second-level aggregated records. Minute-level, hour-level, day-level and week-level aggregated records are higher-level aggregated records with respect to the second-level aggregated records. Hour-level, day-level and week-level aggregated records are higher-level aggregated records with respect to the minute-level aggregated records. Day-level and week-level aggregated records are higher-level aggregated records with respect to the hour-level aggregated records. Week-level aggregated records are higher-level aggregated records with respect to the day-level aggregated records. By contrast, second-level, minute-level, hour-level, and day-level aggregated records are lower-level aggregated records with respect to the week-level aggregated records. Second-level, minute-level, and hour-level aggregated records are lower-level aggregated records with respect to the day-level aggregated records. Second-level and minute-level aggregated records are lower-level aggregated records with respect to the hour-level aggregated records.

The aggregated records are stored in the aggregated records databases of the search and database platforms 805-807. For each event type, the event-type aggregator 812 retrieves batches of lower-level aggregated records of an event type from the aggregated records databases and aggregates the lower-level aggregated records to generate higher-level aggregated records for the event type. In particular, the event-type aggregator 812 performs minute aggregation of the second-level aggregated records to obtain minute-level aggregate records, performs hour aggregation of the minute-level aggregated records to obtain hour-level aggregate records, performs day aggregation of the hour-level aggregated records to obtain day-level aggregate records, and performs week aggregation of the day-level aggregated records to obtain week-level aggregated records. The event-type generator 812 then stores the higher-level aggregated records in the aggregated records databases of the search and database platforms 805-807. The event-type aggregator 812 aggregates aggregated records for an event type to obtain a higher-level aggregated record for the event type by summing the event count of the lower-level aggregated records to obtain the event count of a higher-level aggregated record.

Figure 8C:
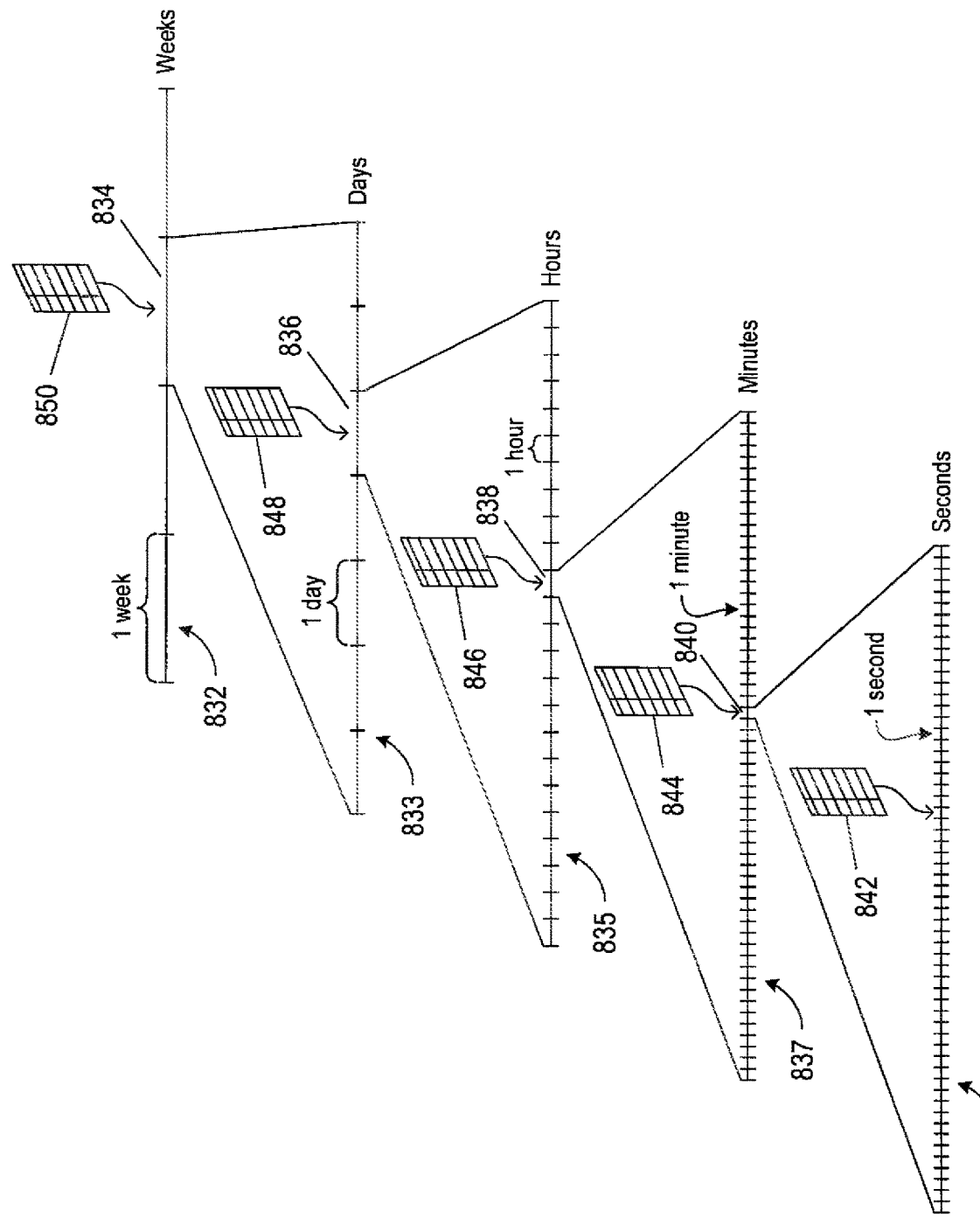
FIG. 8C shows an example of aggregating lower-level aggregated records to generate higher-level aggregated records.

FIG. 8C shows a high-level example of aggregating lower-level aggregated records to generate higher-level aggregated records as performed by the event-type aggregator 812. In this example, a time axis 832 is partitioned into four one-week-long time intervals. Time axis 833 represents one week-long time interval 834 of the time axis 832 partitioned into seven one-day-long (i.e., 24-hours) time intervals. Time axis 835 represents a day-long time interval 836 of the time axis 833 partitioned into twenty-four one-hour-long time intervals. Time axis 837 represents an hour-long time interval 838 of the time axis 835 partitioned into sixty one-minute-long time intervals. Time axis 839 represents a minute-long time interval 840 of the time axis 837 partitioned into sixty one-second-long time intervals. The time axes 832, 833, 835, 837, and 839 represent different time levels with the time axis 839 representing the lowest time level and the time axis 832 representing the highest time level. Each log message classifier generates second-level aggregated records in each of the one-second-long time intervals, such as second-level aggregated record 842, and stores the second-level aggregate records in a corresponding search and database platform. The event-type aggregator 812 retrieves the second-level aggregated records that lie within the one-second time intervals of time axis 839 and aggregates the second-level aggregated records to obtain a minute-level aggregated record 844 in one-minute time interval 840. The event-type aggregator 812 retrieves the minute-level aggregated records that lie within the one-hour-time interval 838 of time axis 835 and aggregates the minute-level aggregated records to obtain an hour-level aggregated record 846 in one-hour time interval 838. The event-type aggregator 812 retrieves the hour-level aggregated records that lie within the one-hour-time intervals of time axis 835 and aggregates the hour-level aggregated records to obtain a day-level aggregated record 848 in one-day time interval 836. The event-type aggregator 812 retrieves the day-level aggregated records that lie within the one-day-time intervals of time axis 833 and aggregates the day-level aggregated records to obtain a week-level aggregated record 850 in one-week time interval 834. The event-type aggregator 812 repeats the same aggregation operation for each of the time intervals of the different time levels. Aggregation of the aggregated records as performed by the event-type aggregator 812 is described below with reference to an example event type in FIGS. 12-18.

Returning to FIG. 8A, dot-dashed arrow 850 represents an event count query sent to the query API 814 from the interface 810. The interface 810 may be, for example, a graphical user interface that enables a user to query an event count for an event type over a query time interval, a LINT UI ("VMware® Log Intelligence user interface") that automatically generates the query in response to a detected problem in execution of an application or hardware, or a client API that automatically generates the event type and the query time interval in response to detecting problem in execution of an application or hardware. In response to the query, the query API 814 splits the query time interval into query time subintervals as described below with reference to FIGS. 20A-20D. Dotted double-headed arrows 852-854 represent the query API 814 sending instructions to retrieve aggregated records for the event type within the query time subintervals to the search and database platforms 805-807. The search and database platforms 805-807 respond to the request by searching for and retrieving aggregate records with time stamps in the query time subintervals. Arrows 852-854 represent the search and database platforms sending the retrieved aggregated records to the query API 814. The query API 814 sums the event counts of the retrieved aggregated records to obtain an event count for the event type in the query time interval. The event count is sent from the query API 814 to the interface 810.

The log management tool 800 provides a significant improvement over existing log management tools, such as the log management tool 700 shown in FIG. 7, by providing a response for an event count in real time. In particular, the log management tool 800 continually maintains aggregated records of various event types at different time levels (i.e., second, minute, hour, day, week levels etc.). The query time subintervals are determined by the query API 814 in a way that matches the highest time levels to the subintervals, thereby minimizing the amount of time the search and database platforms 805-807 spends retrieving aggregated records and minimizing the amount of time the query API 814 spends combining the aggregated records to obtain the event count of the event type over the query time interval.

Detailed operations performed by the log message classifiers 801-803, the event-type aggregator 812, and the query API 814 are now described below with respect to a particular event type and specific time intervals. Implementations of the log message classifiers 801-803, the event-type aggregator 812, and the query API 814 are not limited to the particular event types and time intervals described herein and may be applied to any event type and time intervals.

The log management tool 800 may be integrated with event trend analysis, troubleshooting of performance problems, and RCA. The log services application 808 provides event counts of different event types and different query time intervals in real time, enabling much faster event classification, event trends analysis, troubleshooting of performance problems, and RCA than current log management tools. For example, certain problems in execution of an application or performance of hardware may be correlated with increases in event counts of certain event types or increases in event counts of certain combinations of event types. Occurrences of these event types may be counted periodically in query time intervals and monitored over time to determine if a problem is occurring. An event count of a particular event type that exceeds an associated threshold or increases in event counts of combinations of event types that exceed associated thresholds occur. triggers alerts, such as an alert displayed on a data center dashboard or an email message, enabling administrators and/or application owners to be immediately notified of a problem. Administrators and/or application owners may immediately execute remedial measures to correct the problem. Alternatively, automated remedial measures may be executed to correct the problem.

Log Message Classifier and Second-level Aggregation

Figure 9:
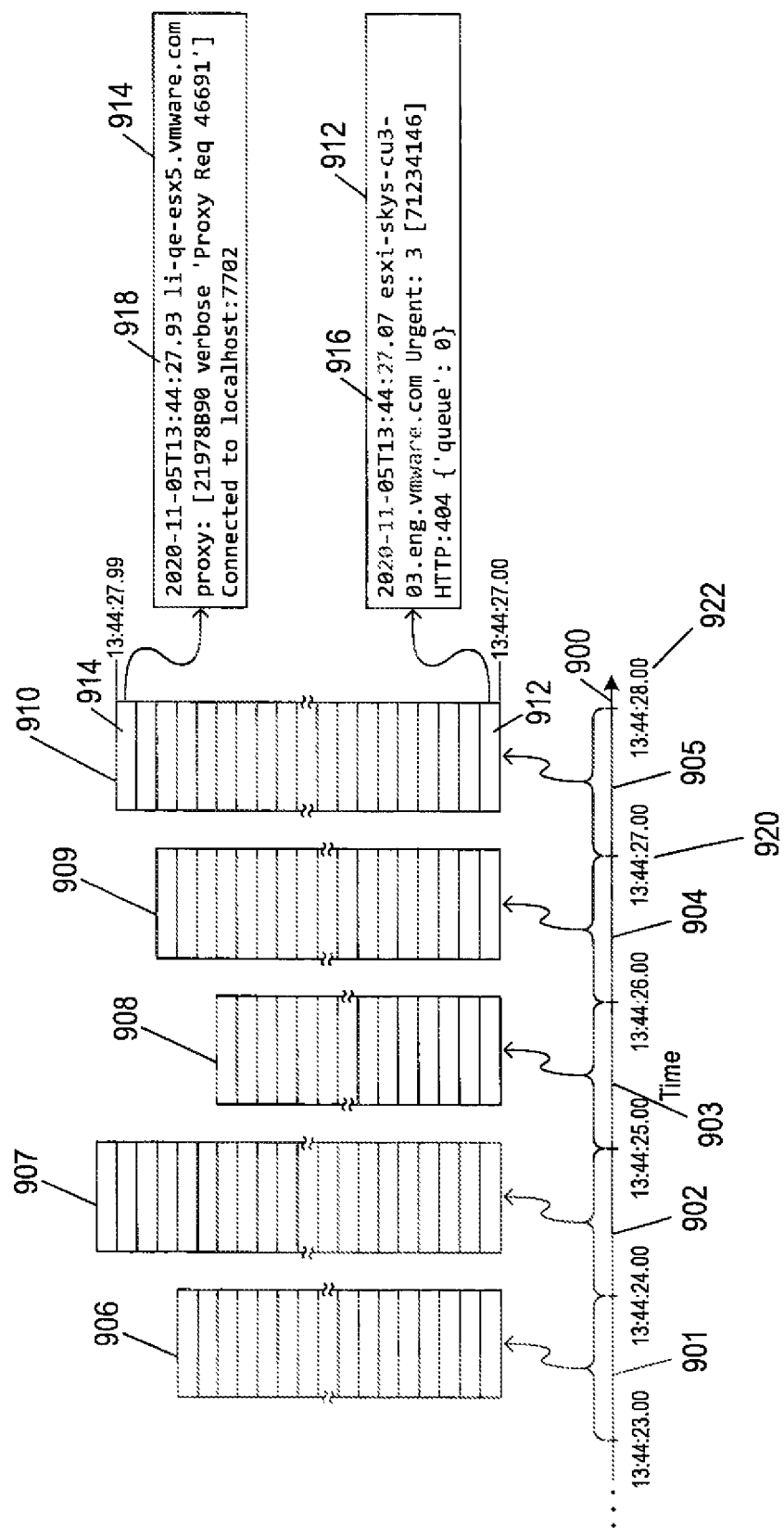
FIG. 9 shows an example of log messages ingested by a log message classifier.

FIG. 9 shows an example of log messages ingested by a log message classifier. In this example, the log message classifier evaluates the log message in one second time intervals. For example, time axis 900 is partitioned into one second time intervals 901-905. Stacks of rectangles 906-910 represent log messages ingested by the log message classifier with time stamps that lie within the time intervals 901-905. For example, log messages 912 and 914 have time stamps 916 and 918, respectively, that lie within time limits 13:44:27.00 920 and 13:44:27.99 922 of the time interval 905.

Note that implementations of log message classifiers are not limited to one second time intervals. In other implementations, a log message classifier may evaluate log messages as described below in longer time intervals, such as two second time intervals, five second time intervals, or ten second time intervals.

Log messages are classified at the time of ingestion by the log message classifier. Each log message classifier performs an automated process of determining the event type of each log message by considering each log message as a set of tokens separated by non-printed characters referred to as "white space." Words, phrases, natural language statements, or text strings are tokens of a log message that form the event type of the log message. The event type of a log message may include other metadata regarding the log message. Log messages with a similar structure belong to the same event type and are assigned the same event type label. Each log message classifier performs the lowest level of real time aggregation by maintaining a count of each event type for each one second time interval. The lowest level of event-type aggregation is called "second-level event-type aggregation."

Figure 10A:
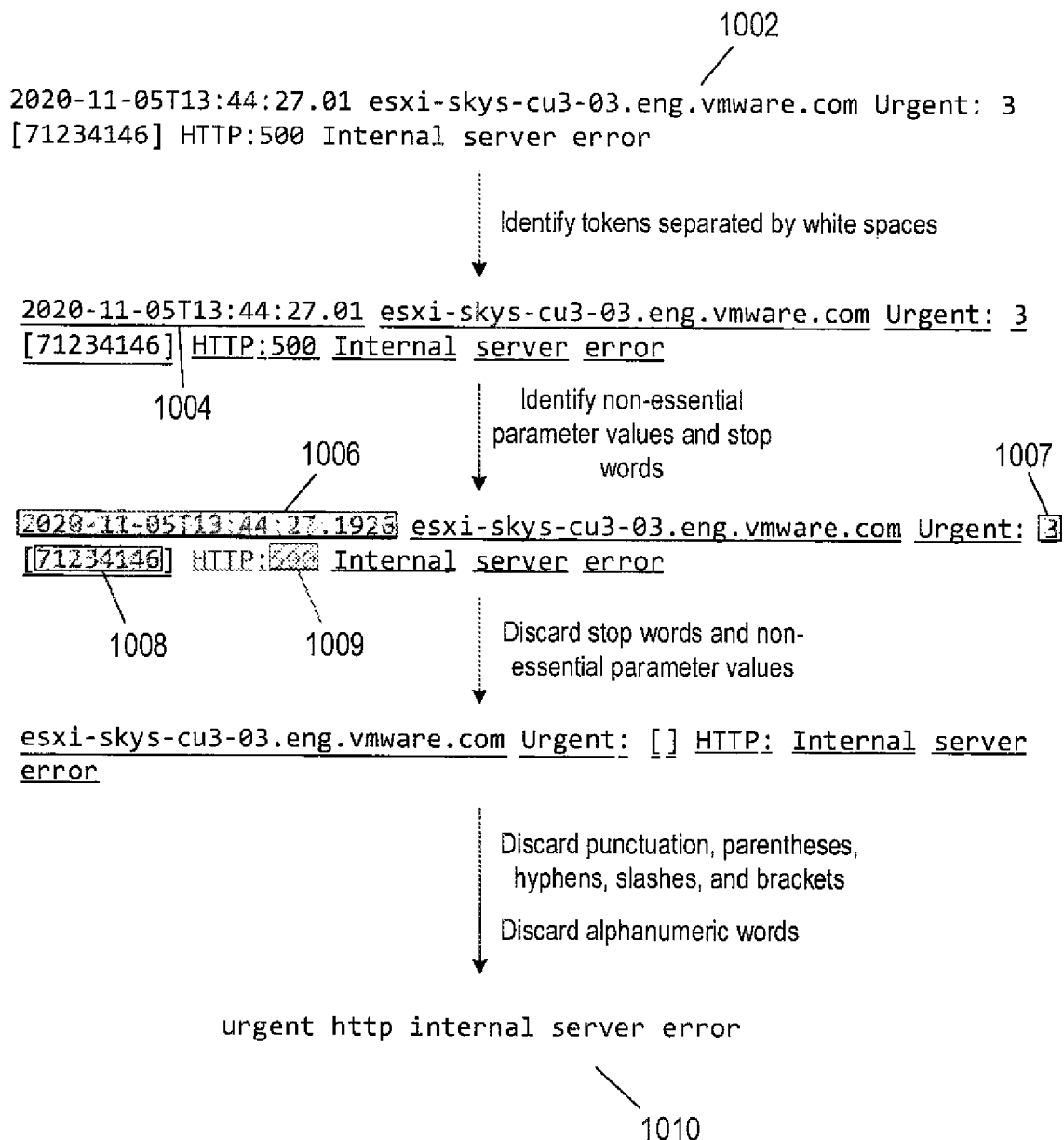
FIG. 10A shows an example of determining an event type for a log message.

FIG. 10A shows an example of determining an event type for a log message 1002. Tokens are identified with underlines. For example, the date and time at the beginning of the log message 1002 are a first token identified by underline 1004. Next, a token-recognition pass is made to identify which tokens are parameters. Parameters are tokens or message fields that are likely to be highly variable over a set of log messages of a particular type. Date/time stamps, for example, are nearly unique for each log message, with two log messages having an identical date/time stamp only in the case that the two log messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. Shaded rectangles 1006-1009 are used to identify parameter tokens in the log message 1002. By contrast, non-parametric tokens are descriptive of the log message and can be words, strings, or natural language phrases, such as "Error" or "Failure." As a result, the parametric-valued tokens are discarded, leaving the non-parametric text words, strings, natural language phrases, punctuation, parentheses, and brackets. Various types of symbolically encoded values, including dates, times, machine addresses, network addresses, and other such parameters can be recognized using regular expressions (i.e., regex) or programmatically. Each log message is also subject to textualization in which an additional token-recognition step of the non-parametric portions of the log message is performed to remove punctuation and separation symbols, such as parentheses and brackets, commas, and dashes that occur as separate tokens or that occur at the leading and trailing extremities of previously recognized non-parametric tokens. Punctuation, parentheses, and brackets are discarded leaving a textualized message of interest that comprises only the non-parametric text strings and natural language words and phrases of the original log message. A textualized log message represents an event type. For example, the text stings 1010 of the log message 1002 is the event type of the log message 1002. Other textualized log messages with the same non-parametric words, text strings and natural language phrase as the textualized log message 1002 are the same event type.

Figure 10B:
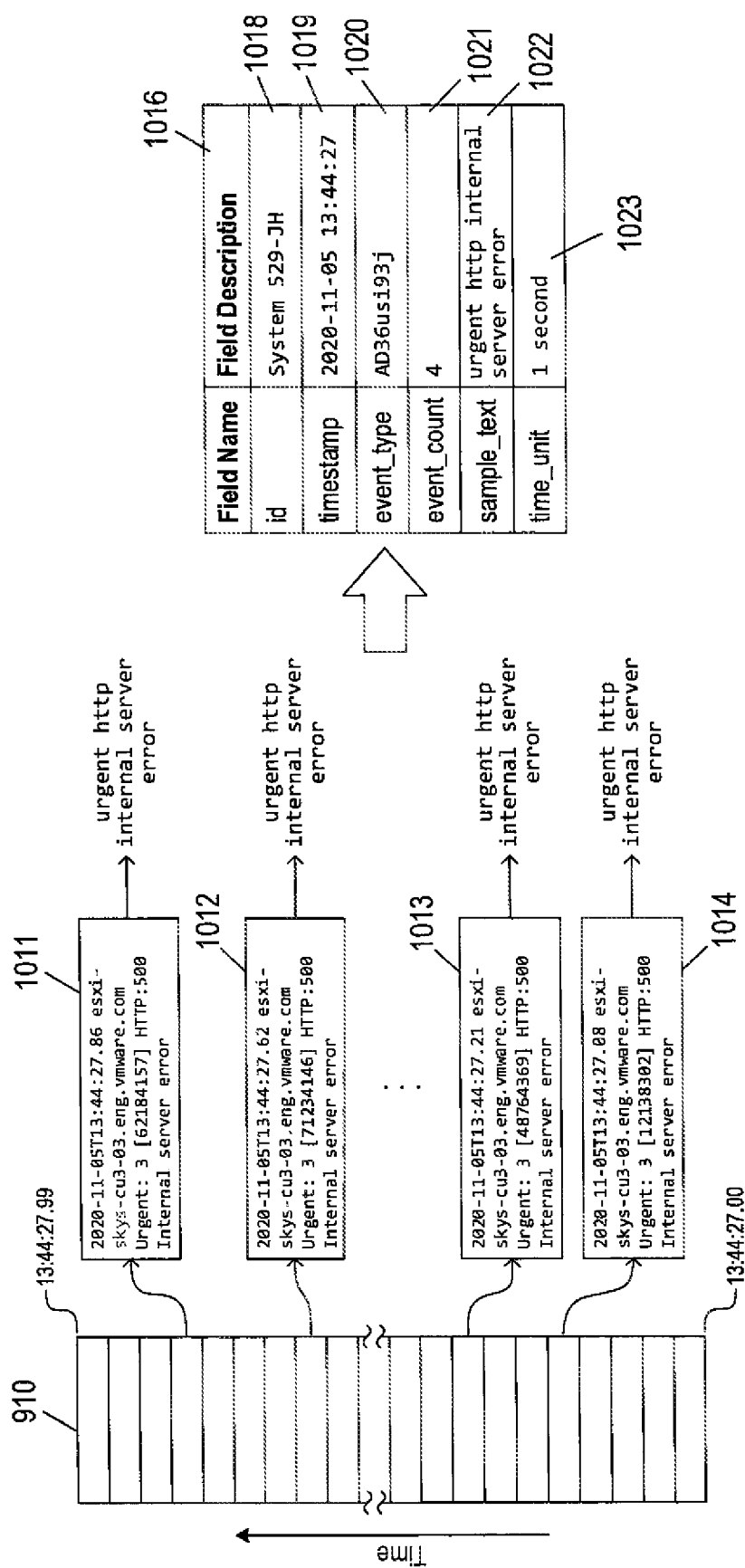
FIG. 10B shows an example of determining an event count of an event type in log messages received in a one second time interval.

FIG. 10B shows an example of determining an event count of an event type in the log messages 910 received in the one second time interval 13:44:27.00 and 13:44:27.99 of FIG. 9. The event type of each log message is determined. In this example, four log messages 1011-1014 of the log messages 910 have a similar structure to the log message 1002 in FIG. 10A and have the same event type of "urgent http internal server error." The log message classifier determines an event type label, counts the number of log messages in each one second time interval with the same event type, time stamp of the one second time interval (e.g., beginning of the one second interval), sample text of the event type, the time unit and system identification (i.e., id) and records this information in a second-level aggregated record. FIG. 10B shows an example second-level aggregated record 1016 of the event type 1010. The second-level aggregated record 1016 includes an example id 1018 for the system that generated the event types, a timestamp 1019 of the event type, which in this example is the beginning time of the one second time interval "Nov. 5, 2020 13:44:27," an example event type label 1020, an even count 1021, a sample text 1022 of the event type, and a time unit 1023, which represents the length of the time interval in which the event types are aggregated to form the second-level aggregated record. In this example, the time unit of the second-level aggregated record is one second because the log message classifier aggregates event types in one second time intervals.

As described above with reference to FIG. 8A, the log message classifiers 801-803 send the second-level aggregated records to the corresponding search and database platforms 805-807. Each search and database platform stores the second-level aggregated records in a search database that may be searched based on the field names.

Figure 11:
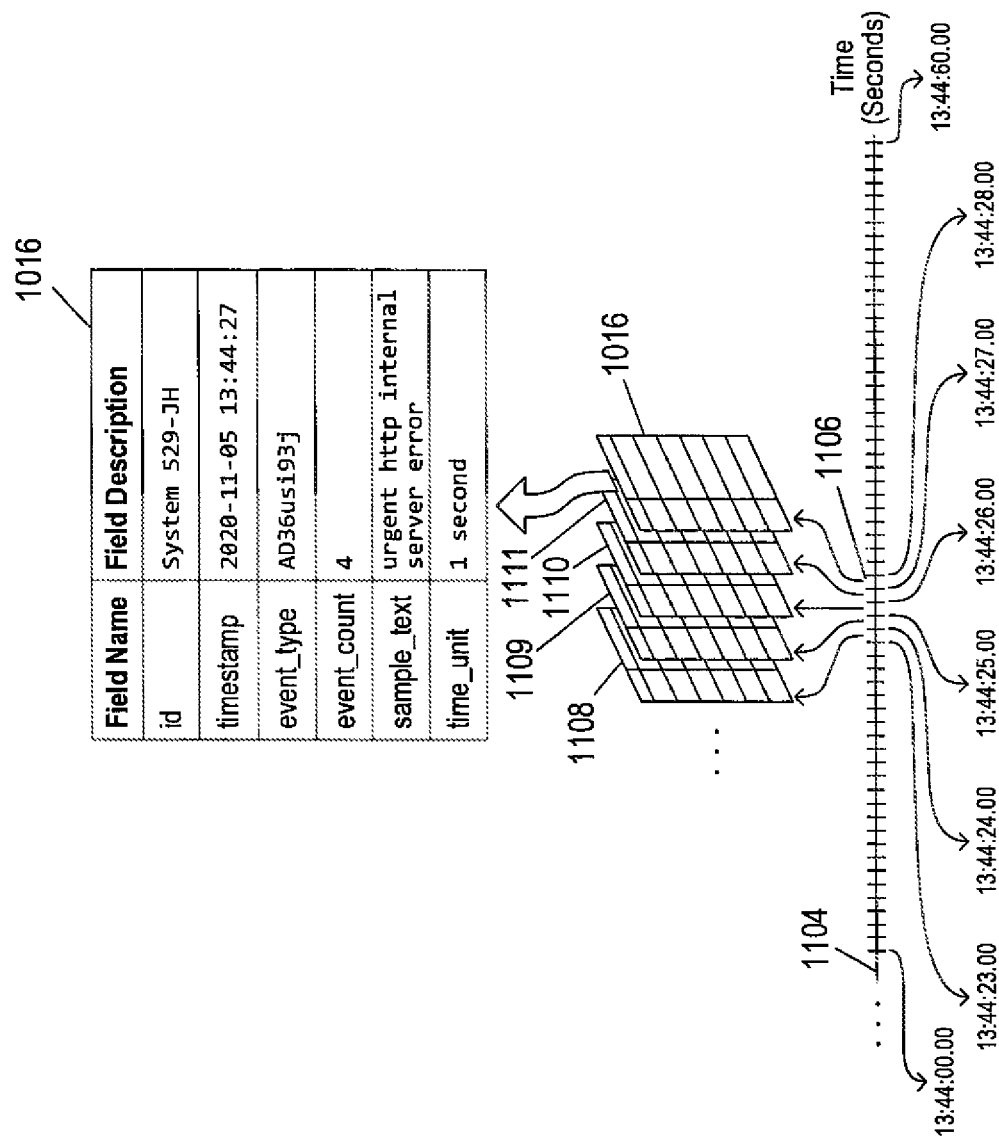
FIG. 11 shows an example of second-level aggregated records associated with the same event type.

FIG. 11 shows an example of second-level aggregated records associated with the same event type 1010. Time axis 1104 is divided into one-second time intervals. Each one-second time interval has an associated second-level aggregated record for the same event type. For example, second-level aggregated record 1016 of FIG. 10B lies within a one-second time interval 1106. Second-level aggregated records 1108-1111 provide the field descriptions of the log messages with the same event type in the log messages 906-909 received in the time intervals 901-904 of FIG. 9 and are obtained in the same manner as described above with reference to FIG. 10B. Each search and database platform stores the second-level aggregated records for numerous different event types generated in numerous one-second time intervals.

As described above with reference to FIGS. 8A and 8C, the event-type aggregator 812 retrieves batches of lower-level aggregated records of each event type and aggregates the lower-level aggregated records to create higher-level aggregated records for the event type. Aggregating aggregated records at a lower time level to create aggregated records at a higher time level is also called "rolling up" the lower-level aggregated records to obtain higher-level aggregated records. Certain information of the lower-level aggregated records carries over to the newly created higher-order aggregated records, such as the system id, event type label, and sample text. In other words, each higher time level aggregate records includes the system id, event type label, and sample text of the higher time level of the lower-level aggregated records. Each higher-level aggregated record includes a new time unit associated with a higher time level, a new time stamp associated with the higher time level and includes an event count obtained by summing the event counts of the lower-level aggregated records.

Minute-Level Aggregation

Figure 12:
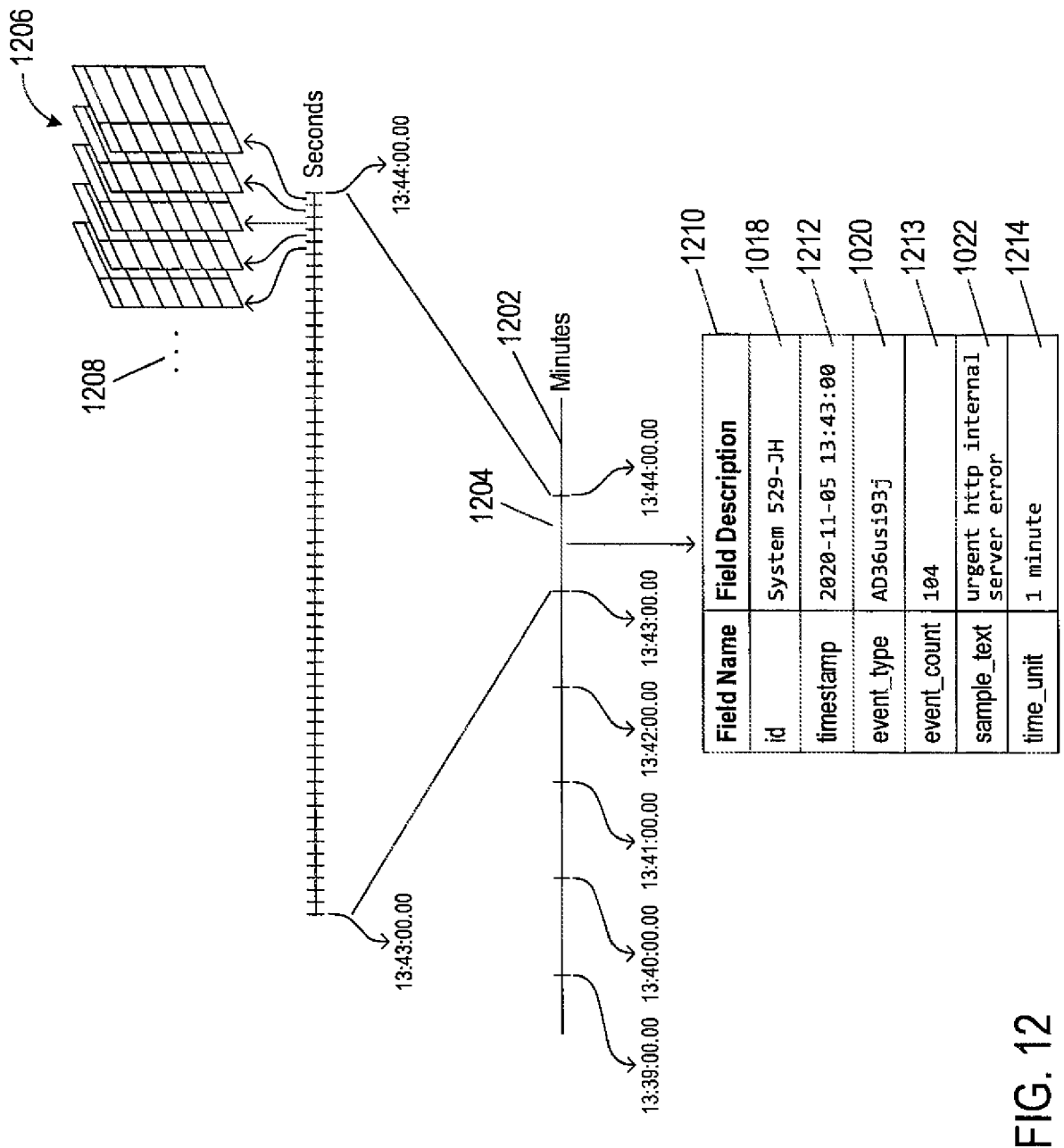
FIG. 12 shows an example of aggregating second-level aggregated records to obtain a minute-level aggregated record.

FIG. 12 shows an example of aggregating (i.e., rolling up) second-level aggregated records to obtain a minute-level aggregated record for the event type 1010. Marks located along a time axis 1202 represent start and end times of one-minute time intervals. FIG. 12 shows an expanded view of a one-minute time interval 1204 with start time 13:43:00.00 and end time 13:44:00.00 partitioned into sixty one-second-time intervals. Sixty second-level aggregated records of the same event type have been obtained for each of the one-second time intervals as described above with reference to FIGS. 9-10B. Five of the sixty second-level aggregated records 1206 are represented with the remaining fifty-five second-level aggregated records represented by ellipsis 1208. FIG. 12 shows a minute-level aggregated record 1210 of the event type 1010. The field descriptions of the minute-level aggregated record 1210 includes the system id 1018, a timestamp 1212 of the event type, which in this example is the beginning time of the one-minute time interval "Nov. 5, 2020 13:43:00," the event type label 1020, an even count 1213, the sample text 1022 of the event type, and a time unit 1214 of one minute, which represents the length of the time interval 1204. The event count 1213 is obtained by summing the event counts of the sixty second-level aggregated records with time stamps in the time interval 1204.

Figure 13:
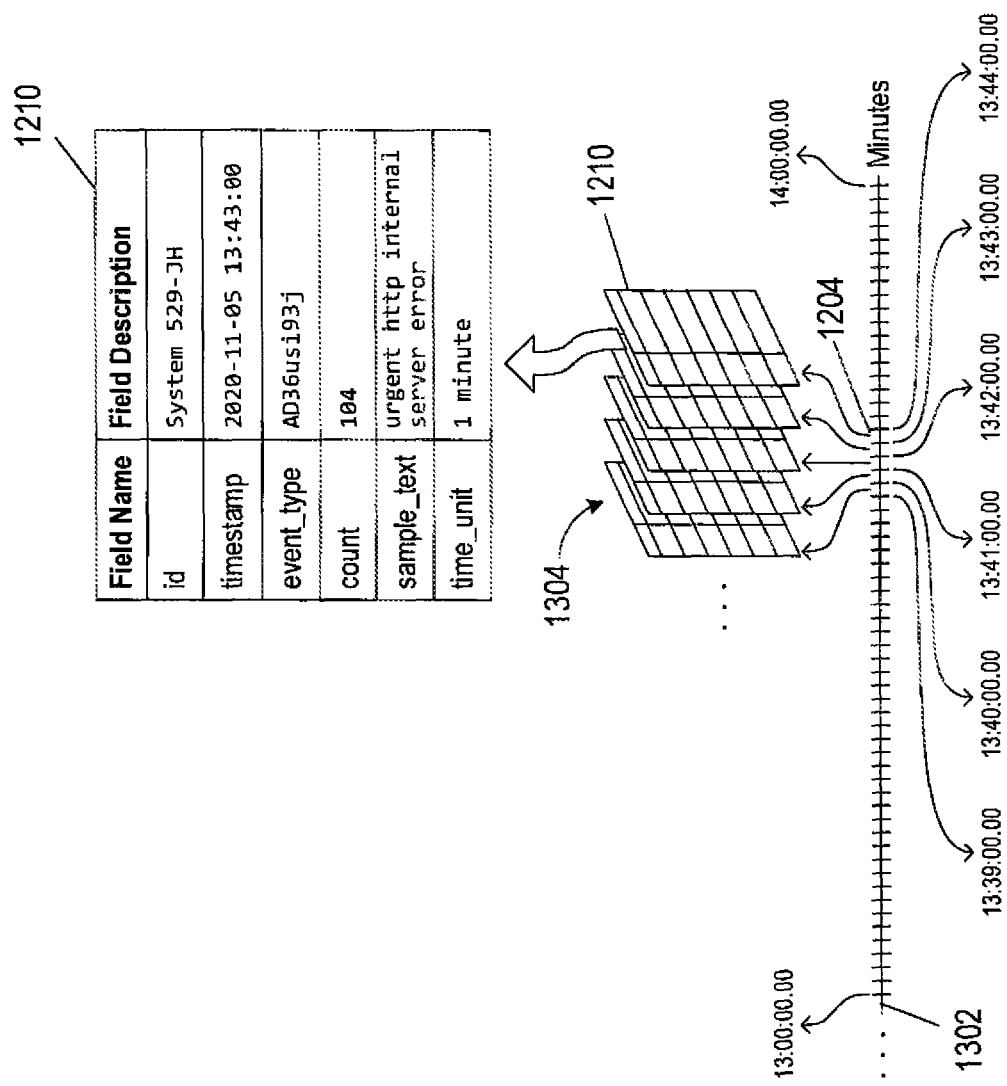
FIG. 13 shows an example of minute-level aggregated records obtained for one-minute time intervals.

The event-type aggregator 812 repeats aggregation of the second-level aggregated records to obtain minute-level aggregated records for each one-minute time interval. FIG. 13 shows an example of minute-level aggregated records obtained for one-minute time intervals. Time axis 1302 is partitioned into one-minute time intervals. Each of the minute-level aggregated records 1304 is obtained by aggregating the second-level aggregated records in adjacent one-minute time intervals as described above with reference to FIG. 12. For example, minute-level aggregated record 1210 is obtained for one-minute time interval 1204. The minute-level aggregated records are stored in the search and database platforms 805-807.

Hour-Level Aggregation

Figure 14:
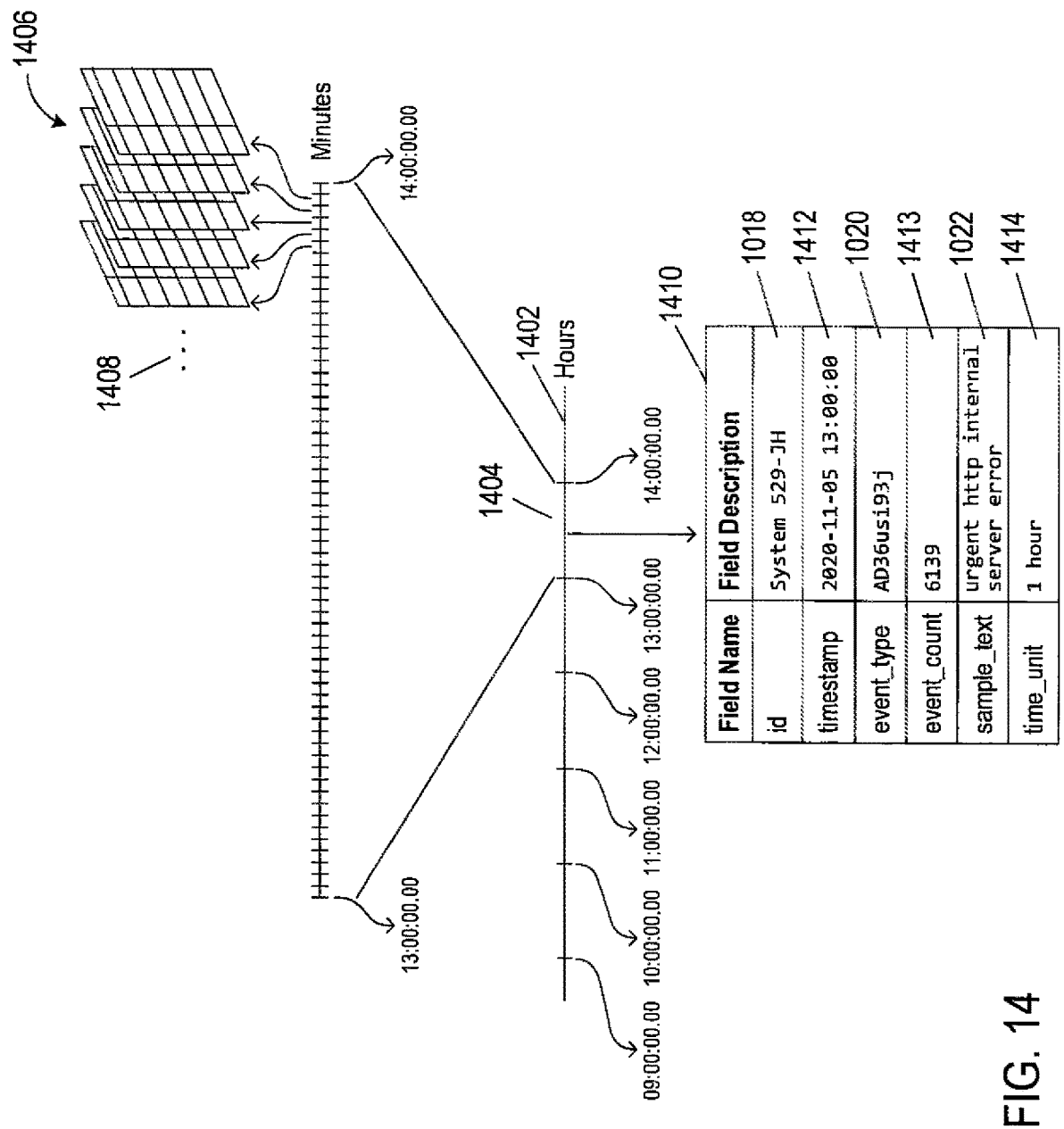
FIG. 14 shows an example of aggregating minute-level aggregated records to obtain an hour-level aggregated record.

FIG. 14 shows an example of aggregating (i.e., rolling up) minute-level aggregated records to obtain an hour-level aggregated record for the event type 1010. Marks located along a time axis 1402 represent start and end times of one-hour time intervals. FIG. 14 shows an expanded view of a one-hour time interval 1404 with start time 13:00:00 and end time 14:00:00 partitioned into sixty one-minute time intervals. Sixty minute-level aggregated records of the event type 1010 have been obtained for each of the one-minute time intervals as described above with reference to FIG. 12. Five of the sixty minute-level aggregated records 1406 are represented with the remaining fifty-five minute-level aggregated records represented by ellipsis 1408. FIG. 14 shows an hour-level aggregated record 1410 of the event type 1010. The field descriptions of the hour-level aggregated record 1410 includes the system id 1018, a timestamp 1412 of the event type, which in this example is the beginning time of the one-hour time interval "Nov. 5, 2020 13:00:00," the event type label 1020, an even count 1413, the sample text 1022 of the event type, and a time unit 1414 of one hour, which represents the length of the time interval. The event count 1413 is obtained by summing the event counts of the sixty minute-level aggregated records with time stamps in the time interval 1404.

Figure 15:
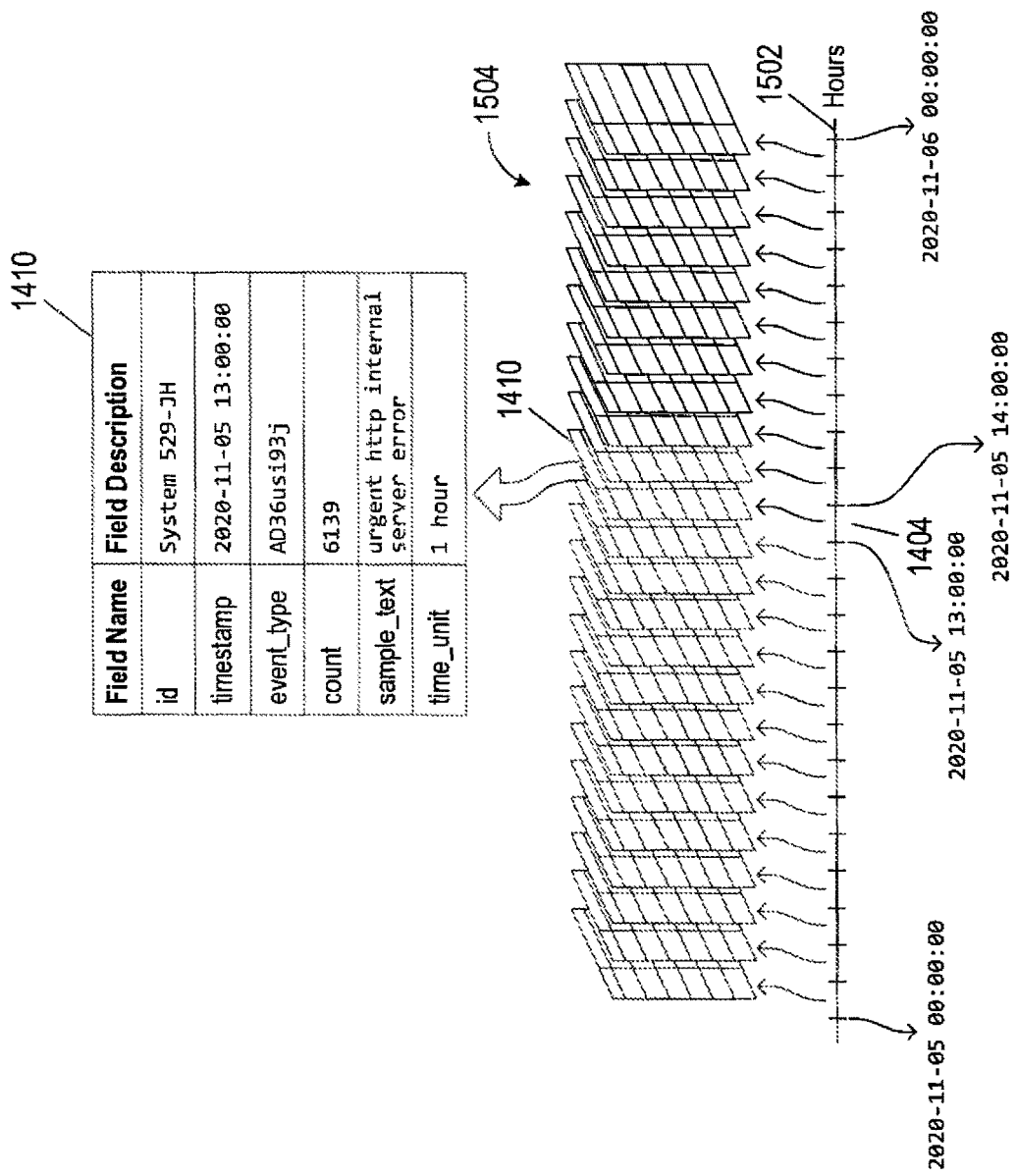
FIG. 15 shows an example of hour-level aggregated records obtained for twenty-four one-hour time intervals.

The event-type aggregator 812 repeats aggregation of the minute-level aggregated records to obtain hour-level aggregated records for each one-hour time interval. FIG. 15 shows an example of hour-level aggregated records obtained for twenty-four one-hour time intervals. Time axis 1502 is partitioned into twenty-four one-hour time intervals. Each of the hour-level aggregated records 1504 is obtained by aggregating the minute-level aggregated records in a corresponding one-hour time interval as described above with reference to FIG. 14. For example, hour-level aggregated record 1410 is obtained for one-hour time interval 1404 described above with reference to FIG. 14. The hour-level aggregated records are stored in the search and database platforms 805-807.

Day-Level Aggregation

Figure 16:
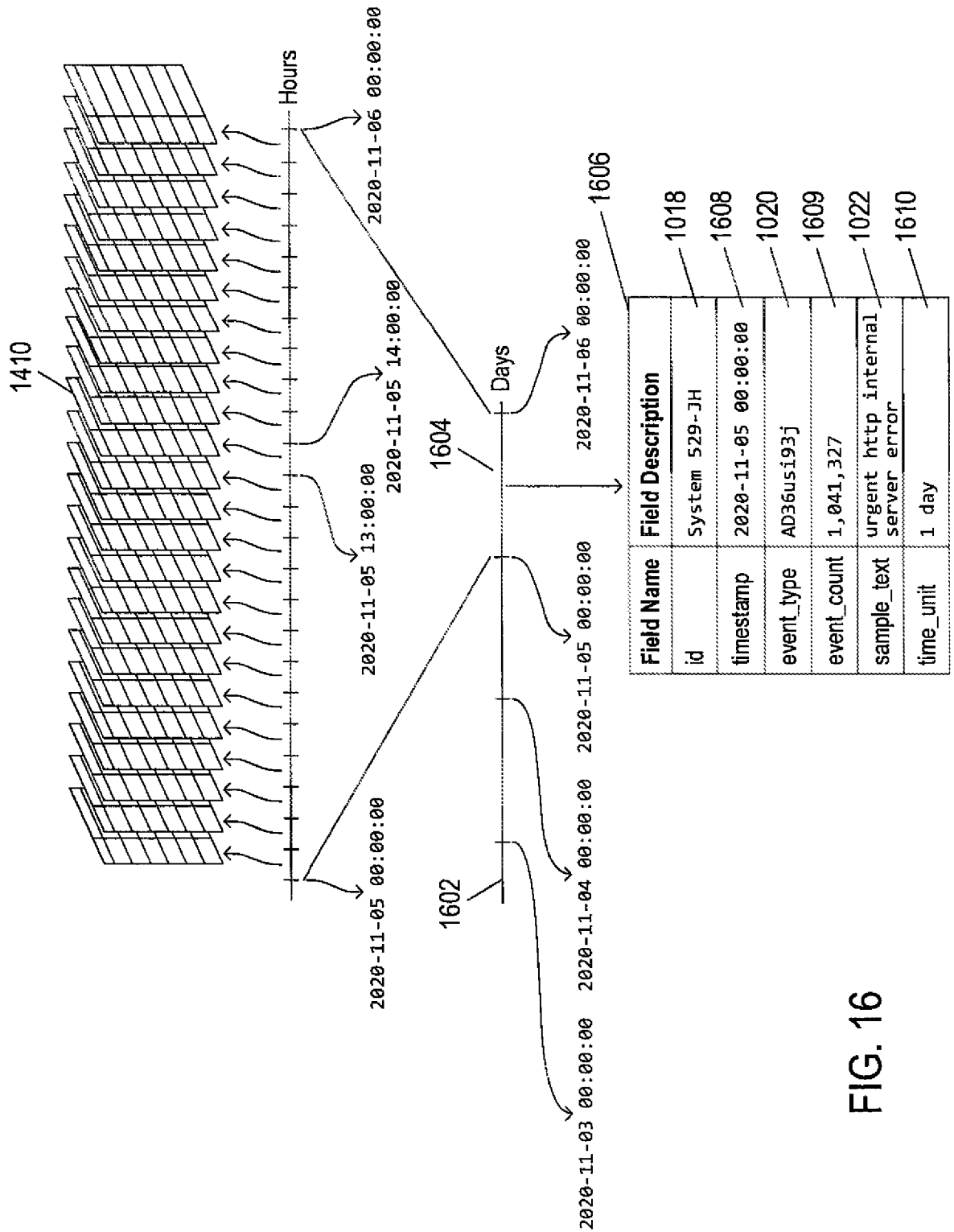
FIG. 16 shows an example of aggregating hour-level aggregated records to obtain a day-level aggregated record.

FIG. 16 shows an example of aggregating (i.e., rolling up) hour-level aggregated records to obtain a day-level aggregated record for the event type 1010. Marks located along a time axis 1602 represent start and end times of one-day time intervals. FIG. 16 shows an expanded view of a one-day time interval 1604 with start time Nov. 5, 2020 00:00:00 and end time Nov. 6, 2020 14:00:00 partitioned into twenty-four one-hour time intervals. Twenty-four hour-level aggregated records of the event type 1010, such as hour-level aggregated record 1410, have been obtained for each of the one-hour time intervals, as described above with reference to FIG. 14. The field descriptions of the day-level aggregated record 1606 includes the system id 1018, a timestamp 1608 of the event type, which in this example is the beginning time of the one-day time interval "Nov. 5, 2020 00:00:00," the event type label 1020, an even count 1609, the sample text 1022 of the event type, and a time unit 1610 of one day, which represents the length of the time interval in which the event types are aggregated. The event count 1609 is obtained by summing the event counts of the twenty-four hour-level aggregated records with time stamps in the time interval 1604.

Figure 17:
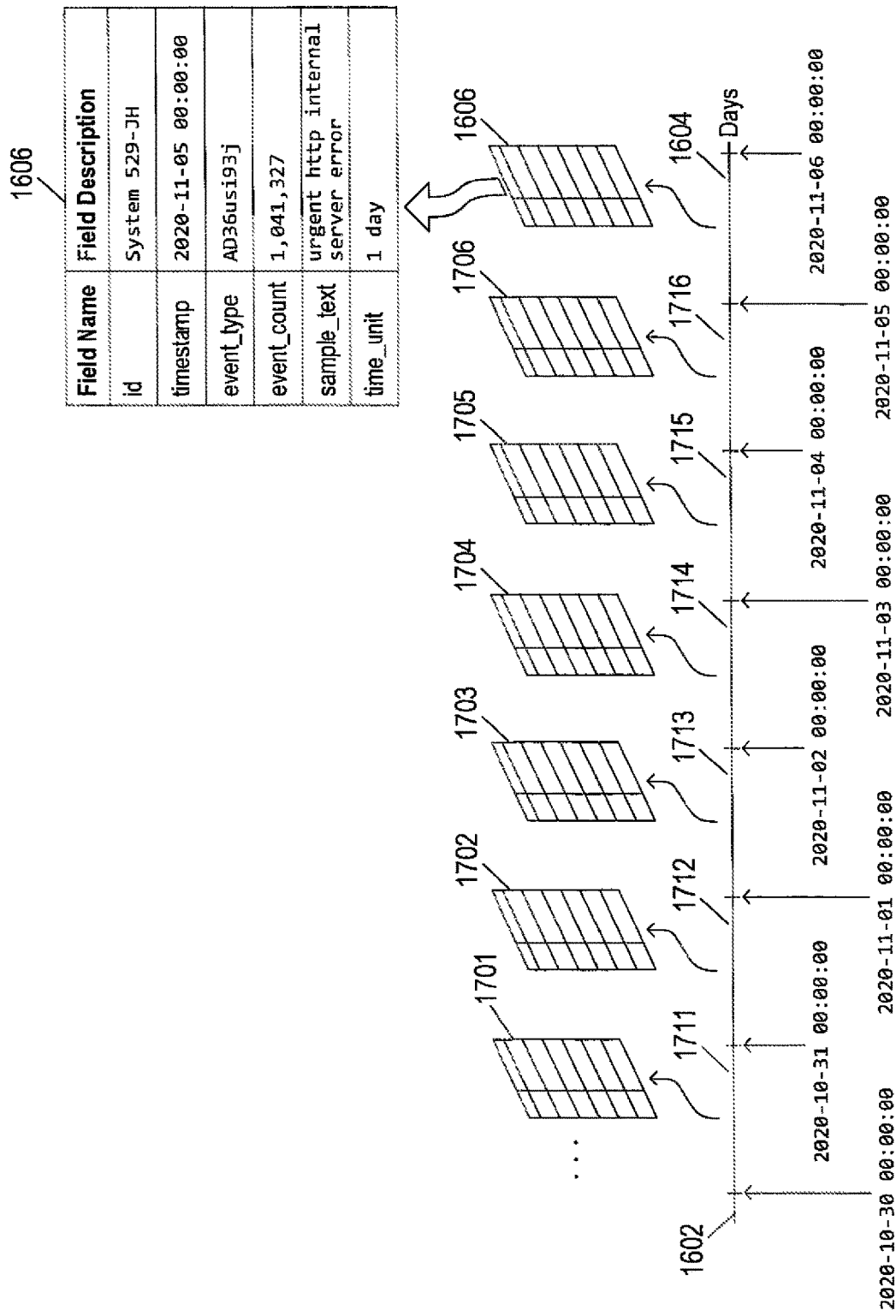
FIG. 17 shows an example of day-level aggregated records obtained for seven one day time intervals.

The event-type aggregator 812 repeats aggregation of the hour-level aggregated records to obtain day-level aggregated records for each one-day time interval. FIG. 17 shows an example of day-level aggregated records obtained for seven one day time intervals. The time axis 1602 is extended and partitioned into seven one-day time intervals and includes the one-day time interval 1604 in which the day-level aggregated record 1606 has been computed. Each of the day-level aggregated records 1701-1706 is obtained by aggregating hour-level aggregated records in the corresponding one-day time intervals 1711-1716 as described above with reference to FIG. 16. The day-level aggregated records are stored in the search and database platforms 805-807.

Week-Level Aggregation

Figure 18:
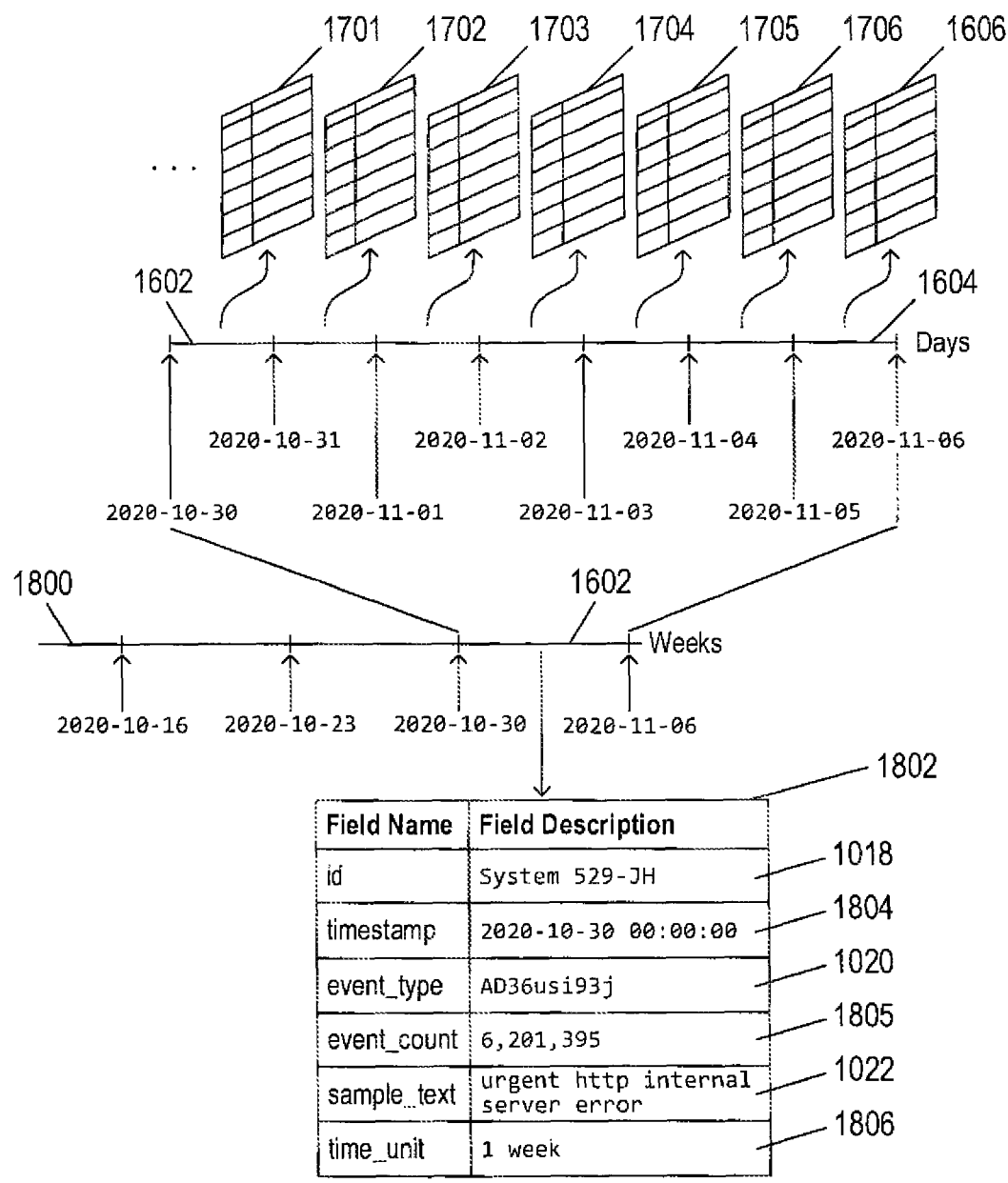
FIG. 18 shows an example of aggregating day-level aggregated records to obtain a week-level aggregated record.

FIG. 18 shows an example of aggregating (i.e., rolling up) day-level aggregated records of the event type 1010 to obtain a week-level aggregated record for the event type. Marks located along a time axis 1800 represent start and end times of one-week time intervals. FIG. 18 shows an expanded view of the one-day time interval 1602 with start date Oct. 30, 2020 and end date Nov. 6, 2020 partitioned into seven one-day time intervals. Seven day-level aggregated records 1701-1706 and 1606 are aggregated to obtain a week-level aggregated record 1802 for the event type 1010. The field descriptions of the week-level aggregated record 1802 includes the system id 1018, a timestamp 1804 of the event type, which in this example is the beginning of the one-day time interval "Oct. 30, 2020 00:00:00," the event type label 1020, an even count 1805, the sample text 1022 of the event type, and a time unit 1806 of one day, which represents the length of the time interval. The event count 1805 is obtained by summing the event counts of the seven day-level aggregated records with time stamps in the time interval 1602. The day-level aggregated records are stored in the search and database platforms 805-807.

Query API

The query API 814 of FIG. 8A splits a query time interval into maximum length subintervals ranging from longest subintervals to shortest subintervals of the query time interval and retrieves aggregated records for each of the subintervals from the search and database platforms. The Query API 814 may split the query time interval into subintervals by first splitting the query time interval according to longest subinterval that corresponds to the highest time level that falls within the query time interval, splitting the query time interval outside the longest subintervals into a next longest subinterval and so on to reach the shortest subintervals that lie within the query time interval are determined. After the query time interval has been split into the subintervals that lie within the query time interval, the query API 814 sends commands to the search and database platforms 805-807 to identify and send the aggregated records of the subintervals to the query API 814. The query API 814 aggregates the aggregated records to obtain an aggregated record for the query time subinterval.

Storing and regularly updating the aggregate records associated with the lowest to the highest time levels in the search and database platforms 805-807 provides a constant response time for aggregated record retrieval from the search and database platforms 805-807 independent of the query time interval selected. Splitting the query time interval into the subintervals minimizes the number of records to be aggregated for a given query time interval.

The interface 810 of FIG. 8A submits a request for an event count of a particular event type. The interface 810 may be a graphical user interface ("GUI") that enables a user to query an event count for an event type over a query time interval, a LINT UI ("VMware® Log Intelligence user interface") that automatically generates the query in response to a detected problem in execution of an application or hardware or as part of a routine check of how event types are trending over time, or a client API that automatically request event counts in query time intervals in response to detecting a problem in execution of an application or hardware or as part of a routine search for event types with changing event counts over time. Large changes in event counts of certain event types may be an indication of problems with performance of an application or hardware and may be used in RCA.

Figure 19:
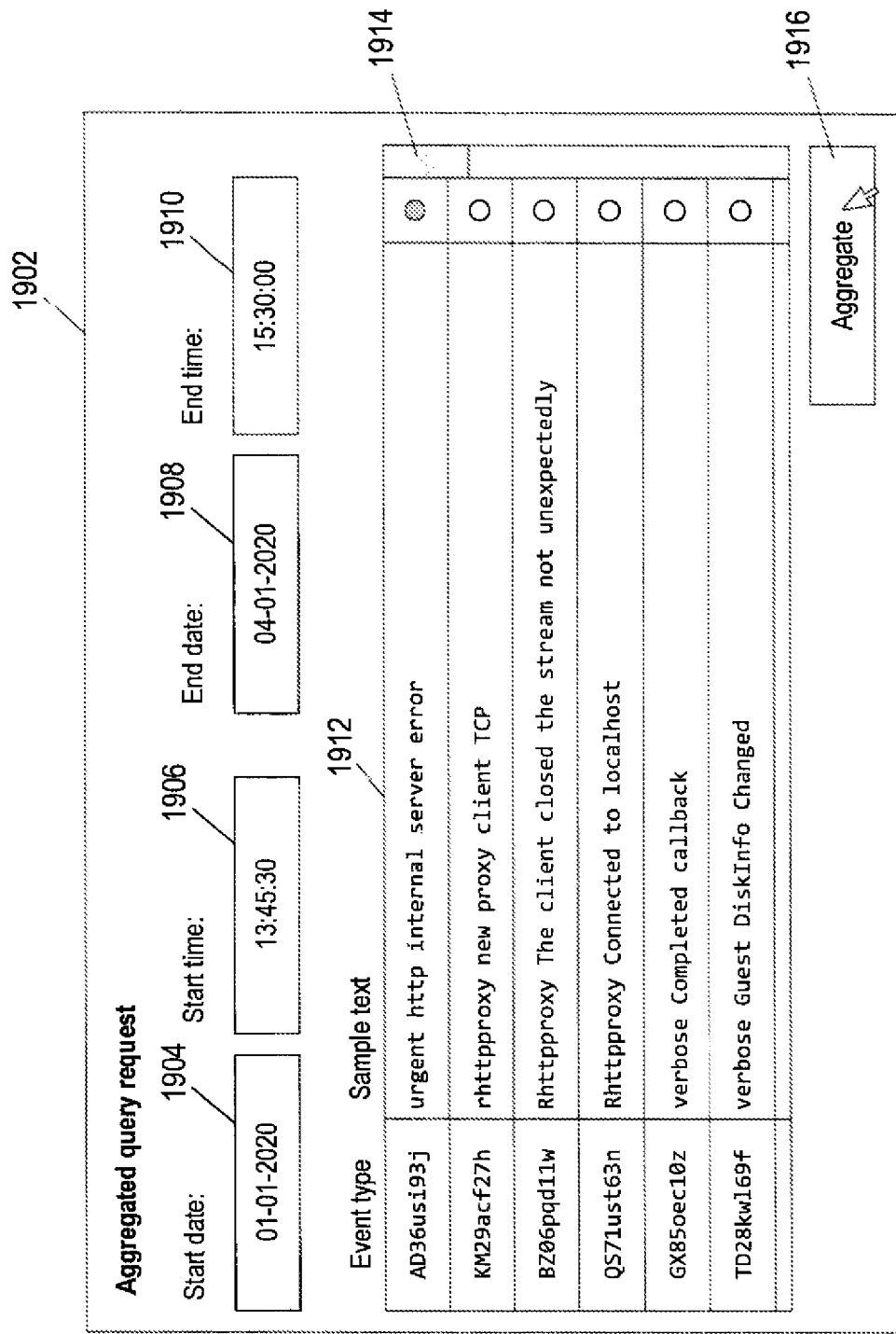
FIG. 19 shows an example graphical user interface with fields that enable a user to enter a start date and time and end date and time for a query time interval.

FIG. 19 shows an example GUI 1902 with fields that enable a user to enter a start date 1904 and start time 1906 and end date 1908 and end time 1910 for a query time interval. The GUI 1902 also includes a field 1912 that displays event types and enables a user to scroll through the event types using a scroll bar 1914 and select any one or more of the event types listed. In other implementations, the field 1912 may display the most recent log message associated with each event type. In this example, a user has selected the event type "urgent http internal server error" for aggregation within an example query time interval from Jan. 1, 2020 13:45:30 to Apr. 1, 2020 15:30:00. When the query API 814 receives the request, query API 814 splits the query time interval into subintervals by identifying the longest subintervals (e.g., weeks, days, or hours) within the query time interval and ends with the shortest subintervals (e.g., hours, minutes, or seconds) located at the outside time limits of the query time interval.

Figure 20A:
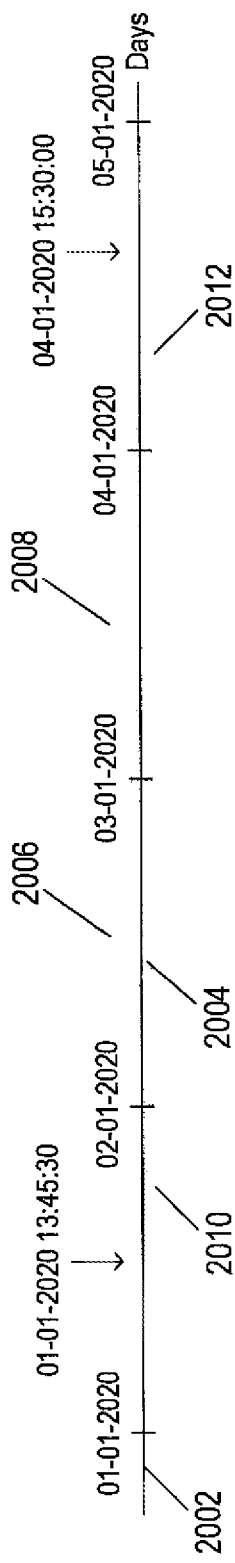
FIGS. 20A-20D show an example of splitting a query time interval into subintervals.
Figure 20B:
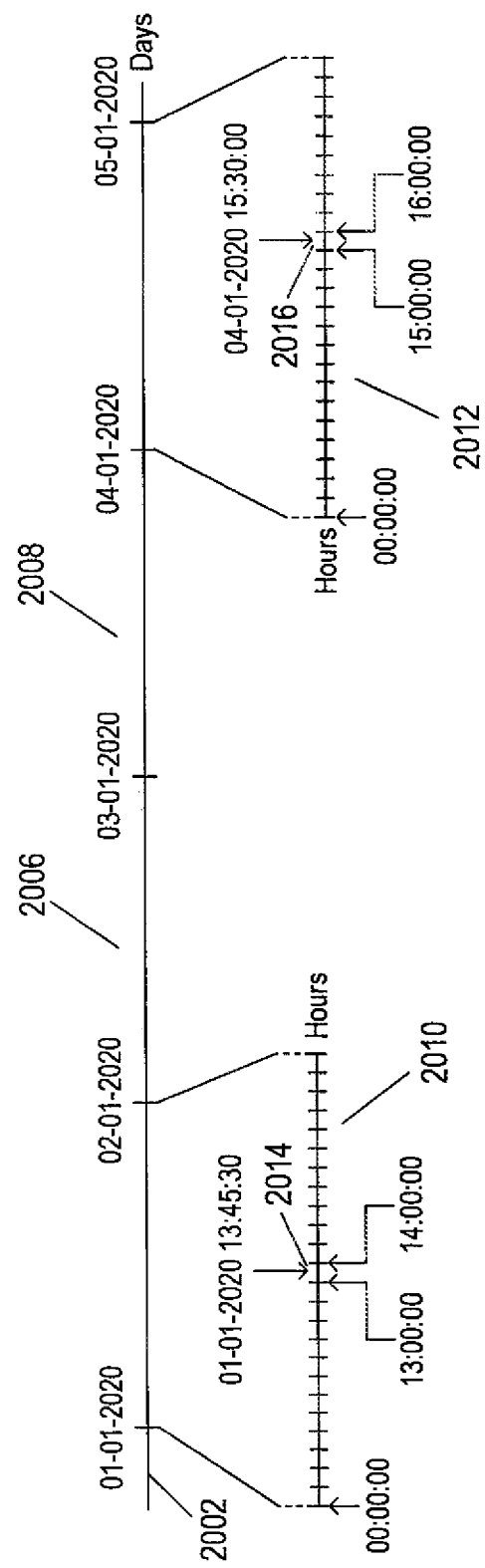
Figure 20C:
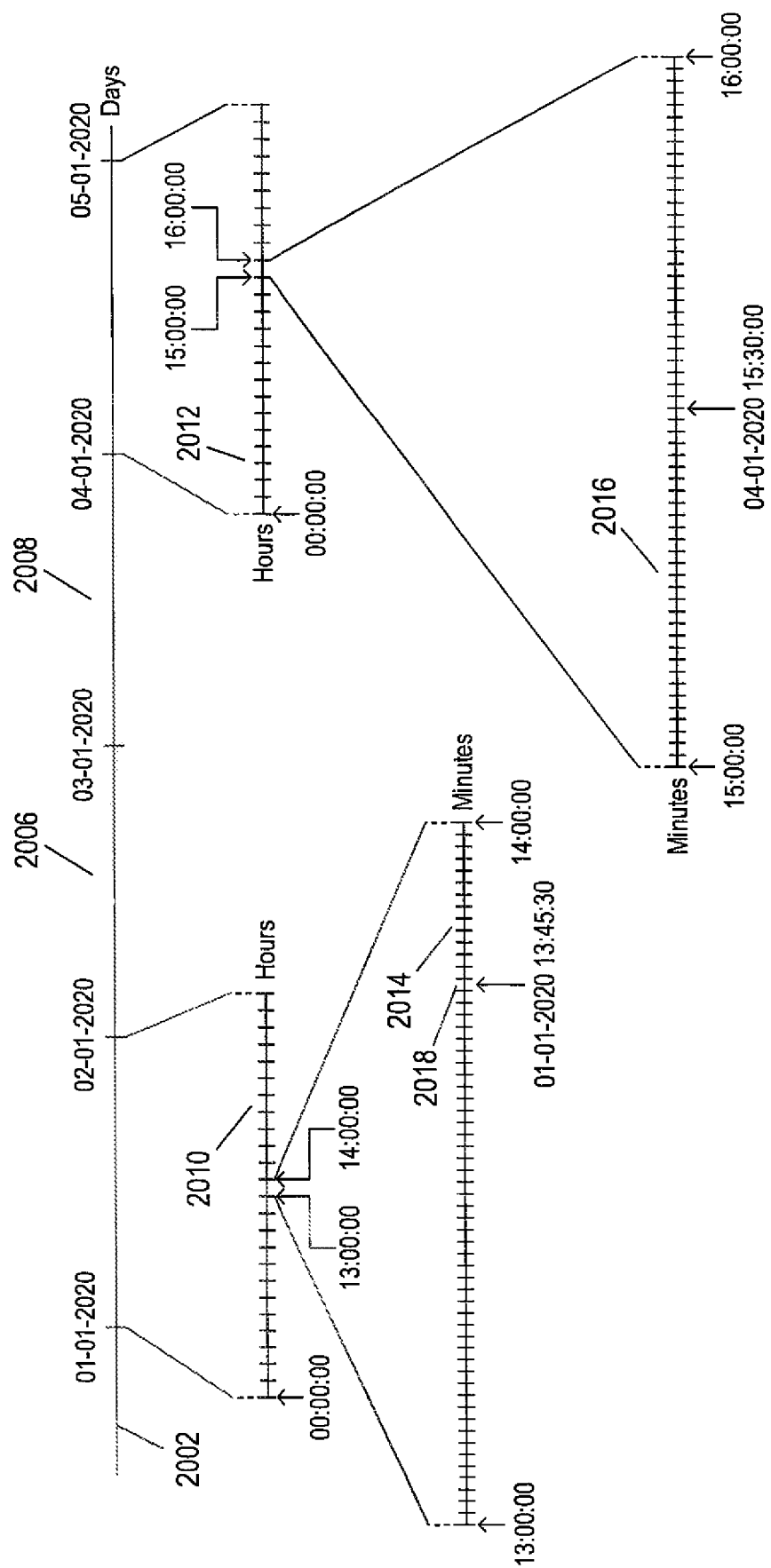
Figure 20D:
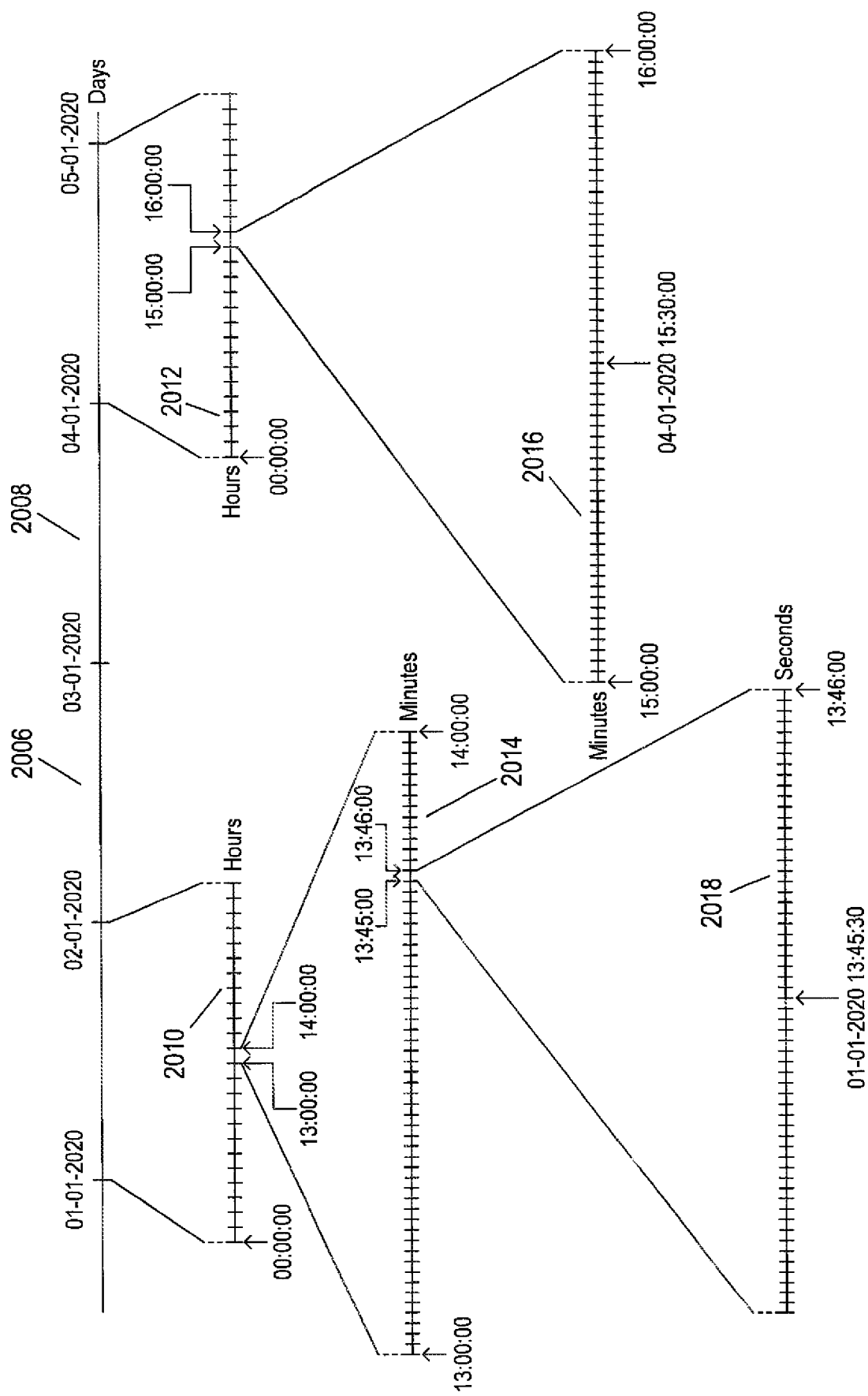

FIGS. 20A-20D show an example of splitting the query time interval from Jan. 1, 2020 13:45:30 to Apr. 1, 2020 15:30:00 into subintervals. The query time interval does not exceed one week but is longer than one day. In FIG. 20A, marks located along time axis 2002 represent start times and end times of four consecutive days. Shaded bar 2004 represents the time span of the query time interval that begins with Jan. 1, 2020 13:45:30 and ends with Apr. 1, 2020 15:30:00. Query splitting determines full day-length subintervals that lie within the query time interval 2004. In this example, the query time interval encompasses two full days indicated by day-length subintervals 2006 and 2008. Shaded portions 2010 and 2012 represent subintervals that do not span full days and are outside the day-length subintervals 2006 and 2008. Query splitting splits the subintervals 2010 and 2012 into hour-length subintervals as shown in FIG. 20B. For example, subinterval 2010 is split into hour-length subintervals between Jan. 1, 2020 14:00:00 and Feb. 1, 2020 00:00:00 and subinterval 2012 is split into hour-length subintervals between Apr. 1, 2020 00:00:00 and Apr. 1, 2020 15:00:00. Shaded portions 2014 and 2016 are subintervals that do not span full hours and are outside the full hour-length subintervals 2010 and 2012. Query splitting splits the subintervals 2014 and 2016 into minute-length subintervals as shown in FIG. 20C. For example, subinterval 2010 is split into minute-length subintervals between Jan. 1, 2020 13:45:00 and Jan. 1, 2020 14:00:00 and subinterval 2012 is split into minute-length subintervals between Apr. 1, 2020 15:00:00 and Apr. 1, 2020 15:30:00. Shaded portion 2018 is a subinterval that does not span a full minute and is outside the minute-length subintervals 2014. Query splitting splits the subinterval 2018 into second-length subintervals as shown in FIG. 20D. Subinterval 2018 is split into second-length subintervals between Jan. 1, 2020 13:45:30 and Jan. 1, 2020 13:46:00.

After the query time interval has been split into subintervals, the query API 814 request the aggregated records associated with the subintervals from the search and database platforms 805-807. The search and database platforms 805-807 identify the aggregated records with time stamps associated with the subintervals and sends the aggregated records to the query API 814. The query API 814 combines the aggregated records to obtain an aggregated record for the query time interval. For example, the query API 814 sums the event counts of the aggregated records to obtain an event count for the query time interval.

Figure 21:
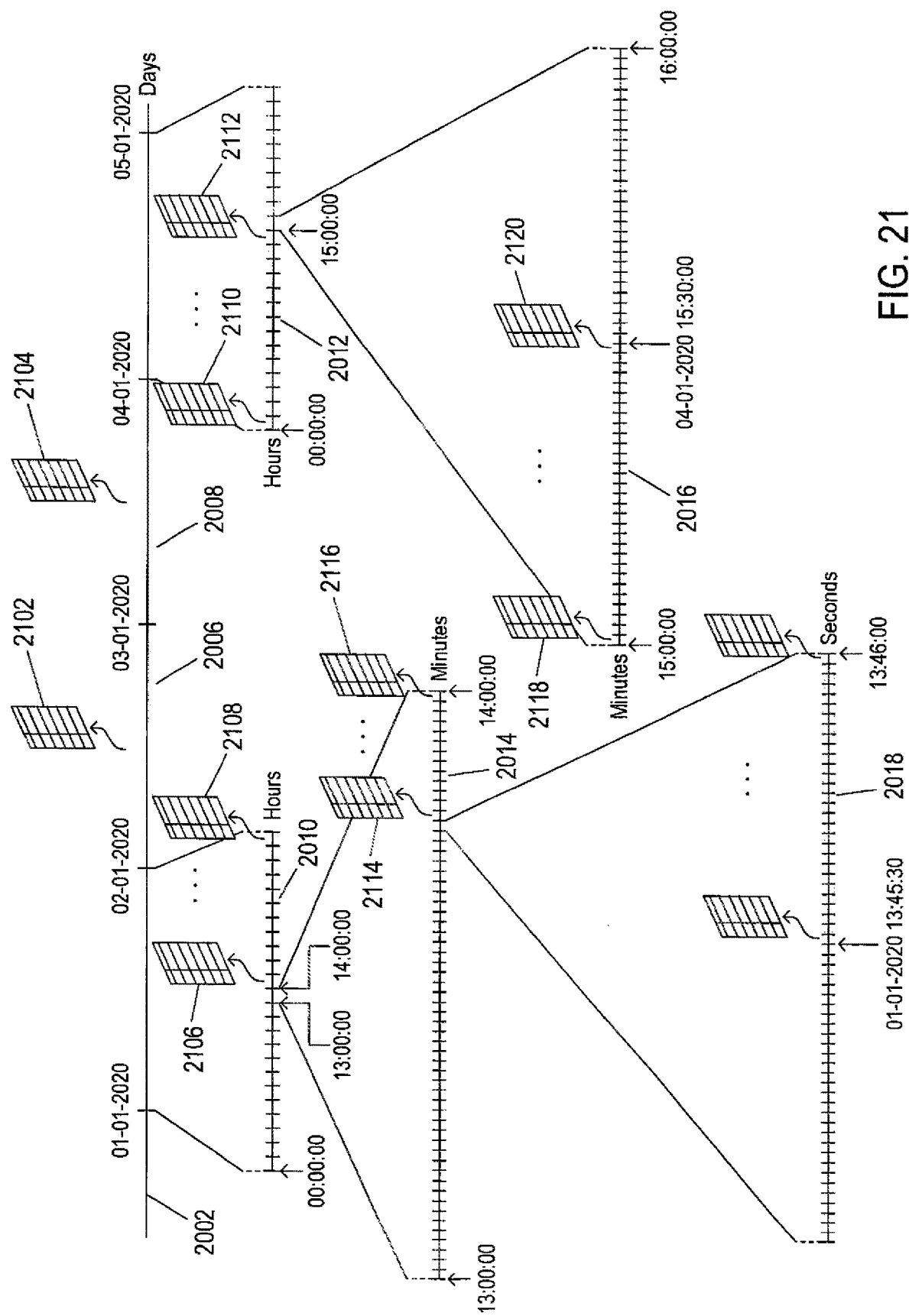
FIG. 21 shows an example of aggregated records identified for the subintervals shown in FIG. 20D.

FIG. 21 shows an example of aggregated records identified for the subintervals of the split query time interval shown in FIG. 20D. Day-level aggregated records 2102 and 2104 are identified for the day-length subintervals 2006 and 2008. Hour-level aggregated records, such as hour-level aggregated records 2106, 2108, 2110, and 2112, are identified for each of the hour-length subintervals 2010 and 2012. Minute-level aggregated records, such as minute-level aggregated records 2114, 2116, 2118, and 2120, are identified for each of the minute-length subintervals 2014 and 2016. Second-level aggregated records, such as second-level aggregated records 2122 and 2120, are identified for each of the second-length subintervals 2018. The query API 814 extracts event counts from each of the aggregated records and sums the event counts to obtain an event count for the query time interval 2004.

The operation of splitting a query time interval into subintervals, identifying aggregated records in the subintervals, and combining event counts to obtain an event count for the query time interval may be repeated for other event types and repeated for different query time intervals. The log services application 808 provides event counts of different event types and different query time intervals in real time, enabling much faster event classification, event trends analysis, troubleshooting of performance problems, and RCA. For example, certain problems in execution of an application or performance of hardware may be correlated with increases in event counts of certain event types or certain combinations of event types. Occurrences of these event types may be counted periodically in query time intervals and monitored over time to determine if a problem is occurring. Administrators and application owners may immediately execute remedial measures to correct the problem. Certain problems may be identified when event counts of certain event types exceed corresponding event count thresholds, which may trigger an alarm identifying the particular problem. Consider, for example, three event types with associated event counts EC1, EC2, and EC3 and corresponding even count thresholds ET1, ET2, and ET3. When EC1>ET1, EC2>ET2, and EC3>ET3 for a query time interval, an alarm is generated on an administrator's console or on an application owners console identifying the type of problem associated with the threshold violations and/or the occurrence of such a violation may immediately trigger automated execution of remedial measures. Remedial measures may include, for example, powering down a server computer executing the application associated with the event types or migrating the application to a different server computer within the data center.

The methods described below with reference to FIGS. 22-26 are stored in one or more data-storage devices as machine-readable instructions and are executed by one or more processors of the computer system shown in FIG. 27.

Figure 22:
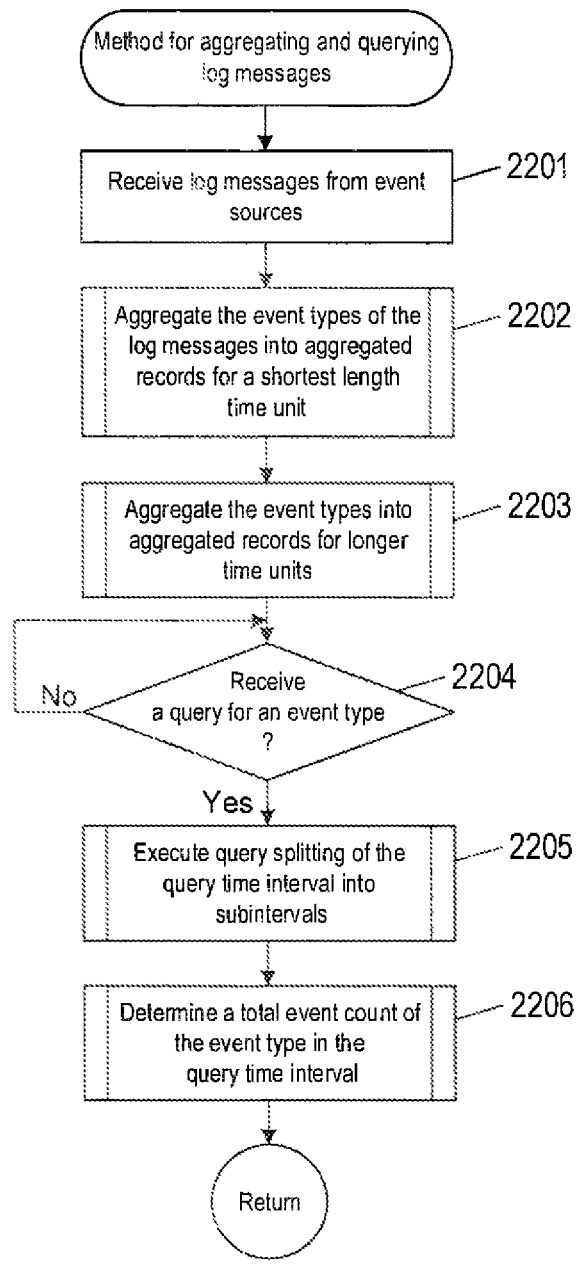
FIG. 22 is a flow diagram of a method for aggregating and querying log messages.

FIG. 22 is a flow diagram of a method for aggregating and querying log messages. In block 2201, log messages generated by various event sources executing in a data center are received at log message classifiers. In block 2202, an "aggregate the event types of the log messages in aggregated records for a shortest time unit" procedure is performed. An example implementation of the "aggregate the event types of the log messages in aggregated records for a shortest time unit" procedure is described below with reference to FIG. 23. In block 2203, an "aggregate the event types in aggregated records for longer time units" procedure is performed. An example implementation of the "aggregate the event types in aggregated records for longer time units" procedure is described below with reference to FIG. 24. In decision block 2204, in response to receiving a query for an event type in a query time interval via an interface, control flows block 2205. For example, a query regarding an event type and a query time interval may be generated in a GUI, LINT UI, or a client API in response to a problem or anomalous behavior observed in a data center as described above. In block 2205, an "execute query splitting of the query time interval into subintervals" procedure is performed. An example implementation of the "execute query splitting of the query time interval into subintervals" procedure is described below with reference to FIG. 25. In block 2206, a "determine total event count of the event type in the query time interval" procedure is performed. An example implementation of the "determine total event count of the event type in the query time interval" describe below with reference to FIG. 26.

Figure 23:
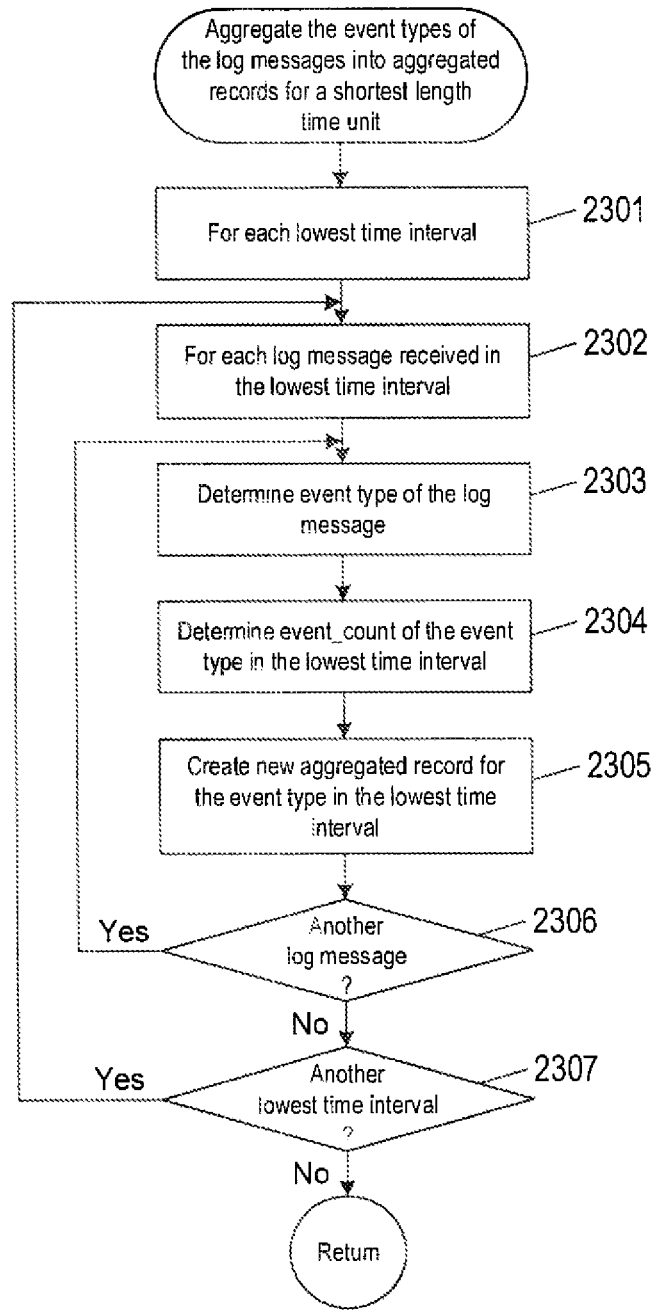
FIG. 23 is a flow diagram illustrating an example implementation of the "aggregate the event types of the log messages in aggregated records for a shortest time unit" procedure performed in FIG. 22.

FIG. 23 is a flow diagram illustrating an example implementation of the "aggregate the event types of the log messages in aggregated records for a shortest time unit" procedure performed in block 2202. A loop beginning with block 2301 repeats the operations represented by blocks 2302-2307 for each lower time interval. For example, the lowest time intervals may be one second time intervals. In other implementations, the lowest time intervals may be two second time intervals, five second time intervals, or ten second time intervals. A loop beginning with block 2302 repeats the operations represented by blocks 2303-2305 for each of the log messages. In block 2303, an event type for the log message is determined as described above with reference to FIGS. 10A. In block 2304, an event count of the number of times the event type occurs in the lowest time interval is determined. In block 2305, a new aggregated record for the event type in the lowest time interval is created with a system identification, an event type label, the event count, the event type, a time stamp in the lowest time interval, and the time unit that matches the length of the lowest time interval as described above with reference to FIG. 10B. In decision block 2306, operations represented by blocks 2303-2305 are repeated for another log message in the lowest time interval. In decision block 2307, operations represented by blocks 2302-2306 are repeated for another lowest time interval.

Figure 24:
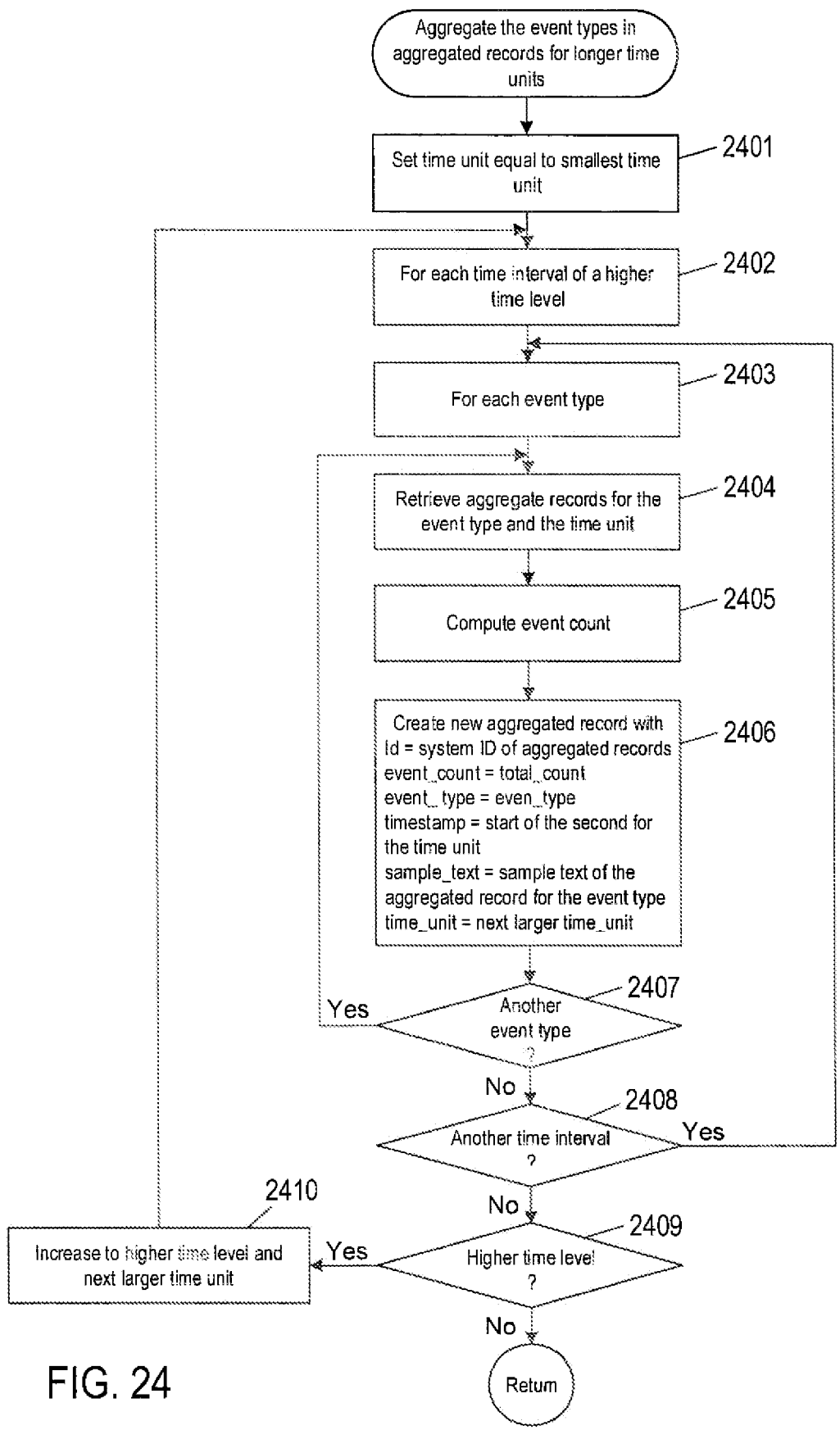
FIG. 24 is a flow diagram illustrating an example implementation of the "aggregate the event types in aggregated records for longer time units" procedure performed in FIG. 22.

FIG. 24 is a flow diagram illustrating an example implementation of the "aggregate the event types in aggregated records for longer time units" procedure performed in block 2203. In block 2401, a time unit is initialized to a shortest time unit. For example, the time unit is initialized to one second for lowest time level aggregated records of one-second-long time intervals. The time unit is initialized to five seconds for lowest time level aggregated records of five-second-long time intervals. The time unit is initialized to ten seconds for lowest time level aggregated records of ten-second-long time intervals. A loop beginning with block 2402 repeats the computational operations represented by blocks 2403-2408 for each time interval of a higher time level. A loop beginning with block 2403 repeats the computational operations represented by blocks 2404-2406 for each even type. In block 2404, aggregated records for the event type, the time unit, and time stamps in the time interval are retrieved from the aggregate record database. In block 2405, an event count is computed from event counts of the aggregated records for the event type and time unit. In block 2406, a new aggregated record is created for the event type at a next longer time unit as described above with reference to FIGS. 12-19. In decision block 2407, the operations represented by blocks 2404-2406 are repeated for another event type. Otherwise control flows to bloc 2408. In decision block 2408, blocks 2402-2407 are repeated for another time interval in the higher time level. In decision block 2409, when all time intervals in the higher time level have been considered control flows to block 2410. In block 2410, the method is repeated for a higher time level and the time unit is increased to next longer time unit.

Figure 25:
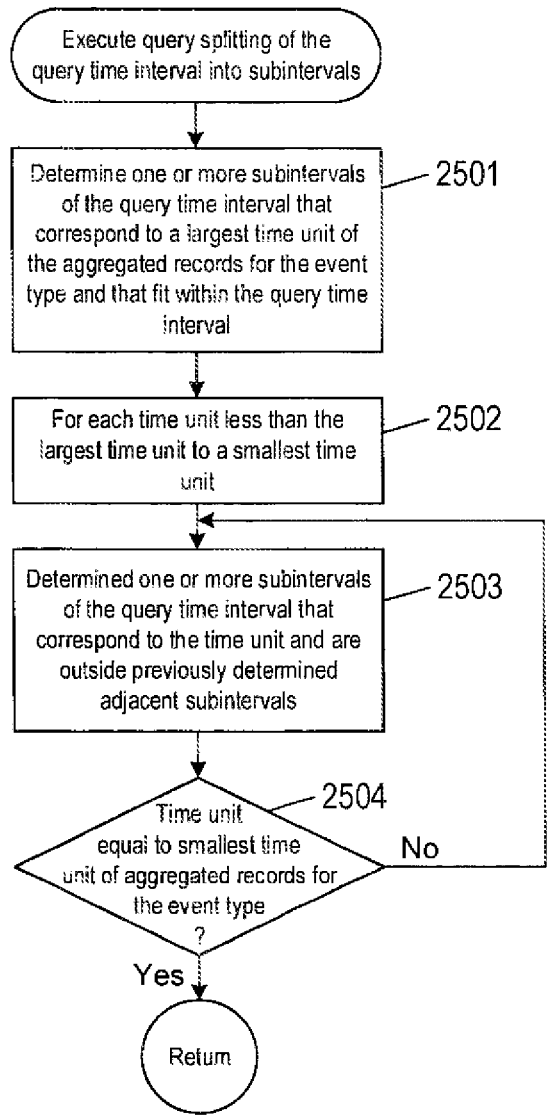
FIG. 25 is a flow diagram illustrating an example implementation of the "execute query splitting of the query time interval into subintervals" procedure performed in FIG. 22.

FIG. 25 is a flow diagram illustrating an example implementation of the "execute query splitting of the query time interval into subintervals" procedure performed in block 2205. In block 2501, for a query time interval received from a user interface, the method determines one or more subintervals of the query time interval. The time length of the one or more subintervals matches a longest time unit of the aggregated records that fits within the query time interval as described above with reference to FIG. 20A. Note that for more than one subinterval, the subintervals are adjacent to one another as shown in FIG. 20A. A loop beginning with block 2502 repeats the operation represented by block 2503 for each time unit below the longest time unit to a shortest time unit. In block 2503, the method determines one or more subintervals of the query time interval that correspond to the time unit and fits within portions of the query time interval outside adjacent previously determined subintervals of the query time interval as described above with reference to FIGS. 20B-20D. In decision block 2504, when the time unit equals the shortest time used of aggregated records for the event type, control returns to FIG. 22.

Figure 26:
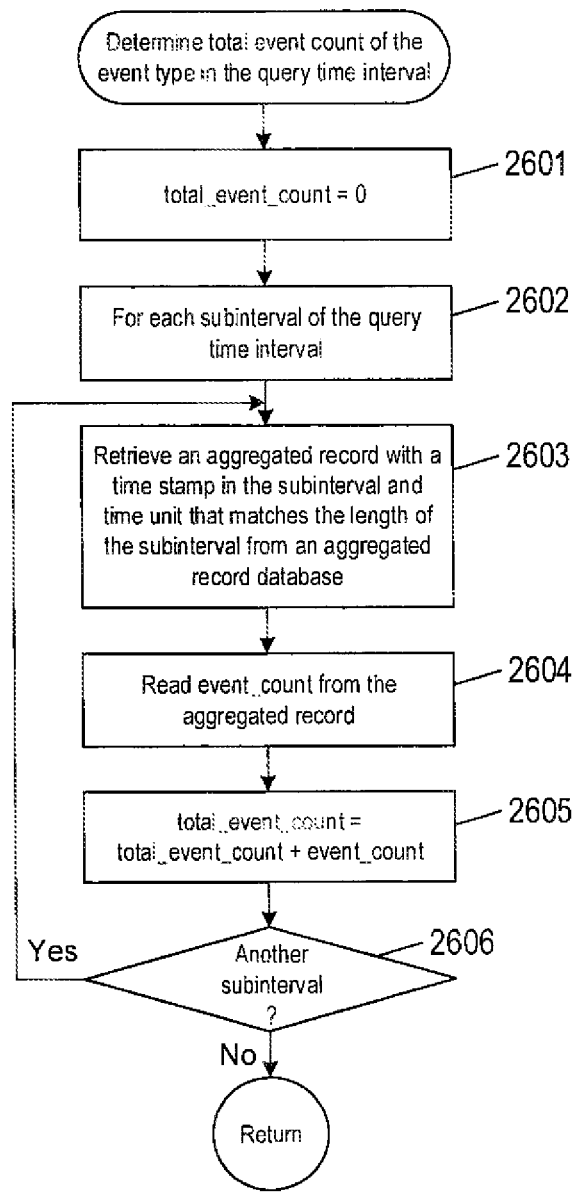
FIG. 26 is a flow diagram illustrating an example implementation of the "determine total event count of the event type in the query time interval" procedure performed in FIG. 22.

FIG. 26 is a flow diagram illustrating an example implementation of the "determine total event count of the event type in the query time interval" procedure performed in block 2206. In block 2601, a total event count for the event type in the query time interval is initialized to zero. A loop beginning with block 2602 repeats the operations represented by blocks 2603-2605 for each subinterval of the query time interval determined in block 2205. In block 2603, an aggregate record with a time stamp in the subinterval and time unit that matches the length of the subinterval is retrieved from an aggregated records database maintained by the search and database platforms 805-807. In block 2604, an event count is read from the aggregate record. In block 2605, the event count is added to the total event count. In block 2606, blocks 2603-2605 are repeated for another subinterval of the query time interval.

Figure 27:
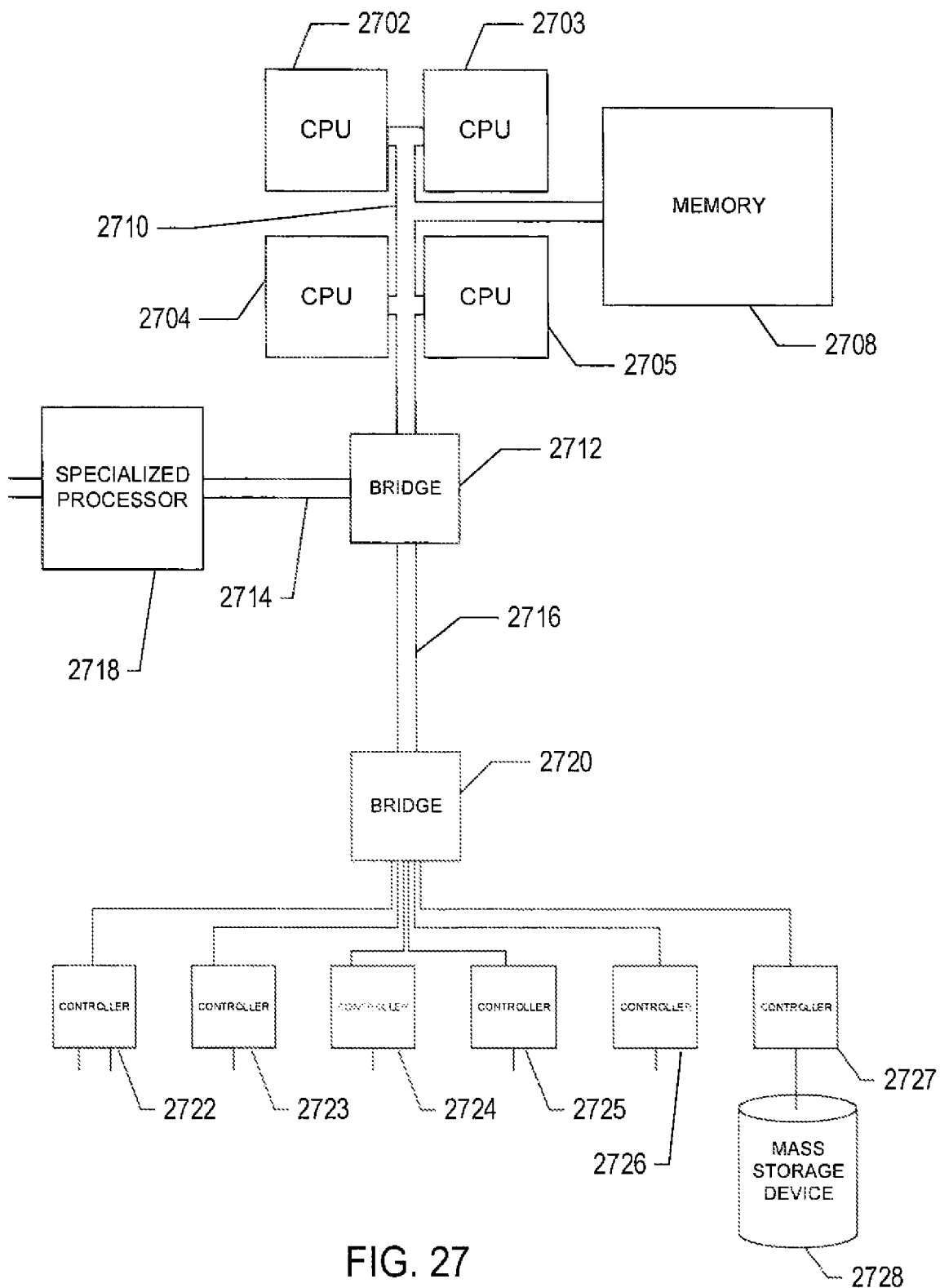
FIG. 27 shows an example of a computer system that executes operations performed by a log management tool.

FIG. 27 shows an example of a computer system that executes a method for aggregating and querying log messages described above. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. Computers that receive, store log messages and execute the architecture for the log management tool 800 may be described by the architectural diagram shown in FIG. 27, for example. The computer system contains one or multiple central processing units ("CPUs") 2702-2705, one or more electronic memories 2708 interconnected with the CPUs by a CPU/memory-subsystem bus 2710 or multiple busses, a first bridge 2712 that interconnects the CPU/memory-subsystem bus 2710 with additional busses 2714 and 2716, or other types of high-speed interconnection media, including multiple, high-speed serial interconnects. These busses or serial interconnections, in turn, connect the CPUs and memory with specialized processors, such as a graphics processor, and with one or more additional bridges 2720, which are interconnected with high-speed serial links or with multiple controllers 2722-2727, such as controller 2727, that provide access to various types of mass-storage devices 2728, electronic displays, input devices, and other such components, subcomponents, and computational devices. The mass-storage device 2728 stores machine-readable instructions for executing the log management tool 800. It should be noted that computer-readable data-storage devices include optical and electromagnetic disks, electronic memories, and other physical data-storage devices.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computer-implemented method stored in one or more data-storage devices and executed using one or more processors of a computer system for aggregating and querying log messages generated by event sources in a distributed computing system, the method comprising:
   determining event types of log messages generated by event sources of the distributed computing system;
   aggregating the event types into aggregated records for a shortest time unit and storing the aggregated records in an aggregated records database, each aggregated record corresponding to one of the event types;
   retrieving the aggregated records from the aggregated records database, aggregating the aggregated records of each even type for longer time units than the shortest time unit, and storing the aggregated records for longer time units in the aggregated records database; and
   in response to receiving a query regarding occurrences of an event type in a query time interval via an interface,
       splitting the query time interval into subintervals with time lengths that range from the shortest time unit to a longest time unit that lie within the query time interval, and
       determining a total event count of occurrences of the event type in the query time interval based on the aggregated records with the same event type and time stamps in the subintervals, where in the total event count is a sum of event counts of the event type in the subintervals of the query time interval.

2. The method of claim 1 wherein aggregating the event types into aggregated records for a shortest time unit comprises:
for each lowest level time interval with a length that matches the shortest time unit,
for each event type occurring in the lowest time interval,
determining an event type label for the event type;
determining an event count of the number of times the event type occurs in the lowest time interval;
creating a new lowest-level aggregated record for the event type, the new aggregated record of the event count and the shortest time unit;
adding system identification, event type label, and timestamp associated with the lowest time interval to the aggregated record; and
storing the lowest-level aggregated record in the aggregated records database.

3. The method of claim 1 wherein aggregating the aggregated records of each event type for longer time units comprises:
initializing a time unit to a shortest time unit of a lowest time level; and
for each time interval of a higher time level,
for each event type with a time stamp in the time interval,
retrieving aggregated records for the event type and time unit with time stamps in the time interval from an aggregated records database,
summing event counts of the aggregated records for the event type to obtain a total count for the event type,
creating a new higher-level aggregated record for the event type with a next longer time unit that matches a length of the time interval of the higher time level,
adding system identification, event type label, the event count of the event type, and a time stamp of the time interval to the higher-level aggregated record, and
storing the higher-level aggregated record in the aggregated records database.

4. The method of claim 1 wherein splitting of the query time interval into subintervals comprises
determining one or more adjacent subintervals of the query time interval, time length of the one or more subintervals matching a longest time unit of aggregated records stored in an aggregated records database and fitting within the query time interval; and
for each time unit less the longest time unit,
determining one or more subintervals of the query time interval that correspond to the time unit and fits within portions of the query time interval located outside previously determined subintervals of the query time interval.

5. The method of claim 1 wherein determining the total event count of occurrences of the event type in the query time interval comprises:
for each subinterval of the query time interval,
retrieving an aggregated record for the event type with a time stamp in the subinterval and time unit that matches the length of the subinterval from an aggregated records database, and
reading an event count from the aggregate record; and
summing the event counts of the event type to obtain the total event count of occurrences of the event type in the query time interval.

6. The method of claim 1 further comprising:
using the total event count in the query time interval to detect a problem in execution of an application or hardware of the distributed computing system; and
displaying an alert that reports the problem in a data center dashboard or an email message.

7. A computer system for aggregating and querying log messages generated by event sources in a distributed computing system, the system comprising:
one or more processors;
one or more data-storage devices; and
machine-readable instructions stored in the one or more data-storage devices that when executed using the one or more processors controls the system to perform operations comprising:
determining event types of log messages generated by event sources of the distributed computing system;
aggregating the event types into aggregated records for a shortest time unit and storing the aggregated records in an aggregated records database, each aggregated record corresponding to one of the event types;
retrieving aggregated records from the aggregated records database, aggregating the aggregated records of each even type for longer time units than the shortest time unit, and storing the aggregated records for longer time units in the aggregated records database; and
in response to receiving a query regarding occurrences of an event type in a query time interval via an interface,
splitting the query time interval into subintervals with time lengths that range from shortest to longest time units that lie within the query time interval, and
determining a total event count of occurrences of the event type in the query time interval based on the aggregated records with time stamps in the subintervals, wherein the total event count is a sum of event counts of the event type in the subintervals of the query time interval.

8. The computer system of claim 7 wherein aggregating the event types into aggregated records for a shortest time unit comprises:
for each lowest level time interval with a length that matches the shortest time unit,
for each event type occurring in the lowest time interval,
determining an event type label for the event type;
determining an event count of the number of times the event type occurs in the lowest time interval;
creating a new lowest-level aggregated record for the event type, the new aggregated record of the event count and the shortest time unit;
adding system identification, event type label, and timestamp associated with the lowest time interval to the aggregated record; and
storing the lowest-level aggregated record in the aggregated records database.

9. The computer system of claim 7 wherein aggregating the aggregated records of each even type for longer time units comprises:
initializing a time unit to a shortest time unit of a lowest time level; and
for each time interval of a higher time level,
for each event type with a time stamp in the time interval, retrieving aggregated records for the event type and time unit with time stamps in the time interval from an aggregated records database, summing event counts of the aggregated records for the event type to obtain a total count for the event type, creating a new higher-level aggregated record for the event type with a next longer time unit that matches a length of the time interval of the higher time level, adding system identification, event type label, the event count of the event type, and a time stamp of the time interval to the higher-level aggregated record, and storing the higher-level aggregated record in the aggregated records database.

10. The computer system of claim 7 wherein splitting of the query time interval into subintervals comprises determining one or more adjacent subintervals of the query time interval, time length of the one or more subintervals matching a longest time unit of aggregated records stored in an aggregated records database and fitting within the query time interval; and for each time unit below the longest time unit,
determining one or more subintervals of the query time interval that correspond to the time unit and fits within portions of the query time interval located outside previously determined subintervals of the query time interval.

11. The computer system of claim 7 wherein determining the total event count of occurrences of the event type in the query time interval comprises:

for each subinterval of the query time interval,
retrieving an aggregated record for the event type with a time stamp in the subinterval and time unit that matches the length of the subinterval from an aggregated records database, and
reading an event count from the aggregate record; and summing the event counts of the event type to obtain the total event count of occurrences of the event type in the query time interval.

12. The computer system of claim 7 further comprising:
using the total event count in the query time interval to detect a problem in execution of an application or hardware of the distributed computing system; and
displaying an alert that reports the problem in a data center dashboard or an email message.

13. A non-transitory computer-readable medium encoded with machine-readable instructions that implement a method carried out by one or more processors of a computer system to perform operations comprising:

determining event types of log messages generated by event sources of a distributed computing system;

aggregating the event types into aggregated records for a shortest time unit and storing the aggregated records in an aggregated records database, each aggregated record corresponding to one of the event types;

retrieving aggregated records from the aggregated records database, aggregating the aggregated records of each even type for longer time units than the shortest time unit, and storing the aggregated records for longer time units in the aggregated records database; and in response to receiving a query regarding occurrences of an event type in a query time interval via an interface,
splitting the query time interval into subintervals with time lengths that range from shortest to longest time units that lie within the query time interval, and determining a total event count of occurrences of the event type in the query time interval based on the aggregated records with time stamps in the subintervals, wherein the total event count is a sum of event counts of the event type in the subintervals of the query time interval.

14. The medium of claim 13 wherein aggregating the event types into aggregated records for a shortest time unit comprises:

for each lowest level time interval with a length that matches the shortest time unit,
for each event type occurring in the lowest time interval,
determining an event type label for the event type;
determining an event count of the number of times the event type occurs in the lowest time interval;
creating a new lowest-level aggregated record for the event type, the new aggregated record of the event count and the shortest time unit;
adding system identification, event type label, and timestamp associated with the lowest time interval to the aggregated record; and
storing the lowest-level aggregated record in the aggregated records database.

15. The medium of claim 13 wherein aggregating the aggregated records of each event type for longer time units comprises:

initializing a time unit to a shortest time unit of a lowest time level; and for each time interval of a higher time level,
for each event type with a time stamp in the time interval,
retrieving aggregated records for the event type and time unit with time stamps in the time interval from an aggregated records database,
summing event counts of the aggregated records for the event type to obtain a total count for the event type,
creating a new higher-level aggregated record for the event type with a next longer time unit that matches a length of the time interval of the higher time level,
adding system identification, event type label, the event count of the event type, and a time stamp of the time interval to the higher-level aggregated record, and
storing the higher-level aggregated record in the aggregated records database.

16. The medium of claim 13 wherein splitting of the query time interval into subintervals comprises determining one or more adjacent subintervals of the query time interval, time length of the one or more subintervals matching a longest time unit of aggregated records stored in an aggregated records database and fitting within the query time interval; and for each time unit below the longest time unit,
determining one or more subintervals of the query time interval that correspond to the time unit and fits within portions of the query time interval located outside previously determined subintervals of the query time interval.

17. The medium of claim 13 wherein determining the total event count of occurrences of the event type in the query time interval comprises:

for each subinterval of the query time interval,
retrieving an aggregated record for the event type with a time stamp in the subinterval and time unit that matches the length of the subinterval from an aggregated records database, and reading an event count from the aggregate record; and summing the event counts of the event type to obtain the total event count of occurrences of the event type in the query time interval.

18. The medium of claim 13 further comprising:

using the total event count in the query time interval to detect a problem in execution of an application or hardware of the distributed computing system; and displaying an alert that reports the problem in a data center dashboard or an email message.

\* \* \* \* \*